US009619791B2

(12) United States Patent
 Malik

(10) Patent No.: US 9,619,791 B2
(45) Date of Patent: *Apr. 11, 2017

(54) METHODS, SYSTEMS, AND PRODUCTS FOR ORDERING ITEMS

(71) Applicant: AT&T INTELLECTUAL PROPERTY I, LP, Atlanta, GA (US)

(72) Inventor: Dale Malik, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/087,305

(22) Filed: Mar. 31, 2016

(65) Prior Publication Data

US 2016/0210601 A1 Jul. 21, 2016

Related U.S. Application Data

(63) Continuation of application No. 14/318,593, filed on Jun. 28, 2014, now Pat. No. 9,342,847, which is a continuation of application No. 12/500,658, filed on Jul. 10, 2009, now Pat. No. 8,794,519, which is a continuation of application No. 11/458,285, filed on Jul. 18, 2006, now Pat. No. 7,575,163.

(51) Int. Cl.
 *G06K 15/00* (2006.01)
 *G06Q 20/12* (2012.01)
 *G06Q 30/00* (2012.01)
 *G06Q 30/06* (2012.01)

(52) U.S. Cl.
 CPC ............. *G06Q 20/12* (2013.01); *G06Q 30/00* (2013.01); *G06Q 30/0601* (2013.01); *G06Q 30/0635* (2013.01)

(58) Field of Classification Search
 CPC .............. G06Q 20/12; G06Q 30/0635; G06Q 30/0601; G06Q 30/00; G06Q 30/02; G06Q 30/0641; G06Q 30/0631
 USPC .................................................. 235/383, 385
 See application file for complete search history.

(56) References Cited

U.S. PATENT DOCUMENTS

| | | |
|---|---|---|
| 5,003,595 A | 3/1991 | Collins et al. |
| 5,265,221 A | 11/1993 | Miller |
| 5,301,246 A | 4/1994 | Archibald et al. |
| 5,621,456 A | 4/1997 | Florin et al. |
| 5,675,510 A | 10/1997 | Coffey et al. |
| 5,708,422 A | 1/1998 | Greenspan et al. |
| 5,880,720 A | 3/1999 | Iwafune et al. |
| 5,914,472 A | 6/1999 | Westrich et al. |
| 5,966,715 A | 10/1999 | Sweeney et al. |
| 5,987,611 A | 11/1999 | Freund |
| 5,991,807 A | 11/1999 | Schmidt et al. |
| 6,021,438 A | 2/2000 | Duvvoori et al. |
| 6,275,268 B1 | 8/2001 | Ellis et al. |
| 6,286,025 B1 | 9/2001 | Chang et al. |

(Continued)

*Primary Examiner* — Paultep Savusdiphol
(74) *Attorney, Agent, or Firm* — Scott P. Zimmerman, PLLC

(57) ABSTRACT

Electronic commerce is enhanced for customer convenience. When an online order is received, a profile may be checked. A customer may her profile with items that are automatically added to the online order. Food and beverages, for example, may be items that are frequently consumed and thus automatically added to any online order. Electronic commerce may thus be enhanced to restock items that are frequently purchased.

20 Claims, 23 Drawing Sheets

(56) References Cited

U.S. PATENT DOCUMENTS

| | | | |
|---|---|---|---|
| 6,336,117 B1 | 1/2002 | Massarani et al. |
| 6,339,826 B2 | 1/2002 | Hayes, Jr. et al. |
| 6,370,629 B1 | 4/2002 | Hastings et al. |
| 6,405,318 B1 | 6/2002 | Rowland |
| 6,473,739 B1 | 10/2002 | Showghi et al. |
| 6,510,458 B1 | 1/2003 | Berstis et al. |
| 6,564,327 B1 | 5/2003 | Klensin et al. |
| 6,596,030 B2 | 7/2003 | Ball et al. |
| 6,678,824 B1 | 1/2004 | Cannon et al. |
| 6,684,240 B1 | 1/2004 | Goddard |
| 6,704,031 B1 | 3/2004 | Kimball et al. |
| 6,711,687 B1 | 3/2004 | Sekiguchi et al. |
| 6,725,380 B1 | 4/2004 | Forlenza et al. |
| 6,728,766 B2 | 4/2004 | Cox et al. |
| 6,742,033 B1 | 5/2004 | Smith et al. |
| 6,778,194 B2 | 8/2004 | Jones et al. |
| 6,795,856 B1 | 9/2004 | Bunch et al. |
| 6,826,692 B1 | 11/2004 | White et al. |
| 6,904,401 B1 | 6/2005 | Hauduc et al. |
| 6,938,045 B2 | 8/2005 | Li et al. |
| 6,968,507 B2 | 11/2005 | Pennell et al. |
| 7,003,734 B1 | 2/2006 | Gardner et al. |
| 7,006,993 B1 | 2/2006 | Cheong et al. |
| 7,047,258 B2 | 5/2006 | McMillen et al. |
| 7,076,558 B1 | 7/2006 | Dunn et al. |
| 7,136,903 B1 | 11/2006 | Phillips et al. |
| 7,162,443 B2 * | 1/2007 | Shah | G06Q 30/06 705/26.35 |
| 7,188,081 B1 * | 3/2007 | Shah | G06Q 30/06 705/26.8 |
| 7,219,304 B1 | 5/2007 | Kraenzel et al. |
| 7,224,777 B1 | 5/2007 | Tannenbaum |
| 7,290,129 B2 | 10/2007 | Chebolu et al. |
| 7,328,439 B1 | 2/2008 | Martyn et al. |
| 7,356,703 B2 | 4/2008 | Chebolu et al. |
| 7,363,245 B1 * | 4/2008 | Dedrick | G06Q 30/06 705/26.8 |
| 7,380,218 B2 | 5/2008 | Rundell et al. |
| 7,478,054 B1 * | 1/2009 | Adams | G06Q 10/10 705/26.43 |
| 7,575,163 B2 | 8/2009 | Malik et al. |
| 7,577,995 B2 | 8/2009 | Virani et al. |
| 7,685,024 B2 * | 3/2010 | Ofer | G06Q 30/00 705/26.7 |
| 7,797,196 B1 | 9/2010 | Aaron | G06Q 30/0601 705/26.1 |
| 2001/0018671 A1 | 8/2001 | Ogasawara et al. |
| 2001/0032134 A1 | 10/2001 | Hardesty et al. |
| 2002/0026605 A1 | 2/2002 | Terry et al. |
| 2002/0049806 A1 | 4/2002 | Gatz et al. |
| 2002/0062223 A1 | 5/2002 | Waugh et al. |
| 2002/0091870 A1 | 7/2002 | Madl et al. |
| 2002/0095357 A1 | 7/2002 | Hunter et al. |
| 2002/0107833 A1 | 8/2002 | Kerkinni et al. |
| 2002/0111907 A1 | 8/2002 | Ling et al. |
| 2002/0116345 A1 | 8/2002 | Harrison et al. |
| 2002/0116396 A1 | 8/2002 | Somers et al. |
| 2002/0116627 A1 | 8/2002 | Tarbotton et al. |
| 2002/0152123 A1 | 10/2002 | Giordano et al. |
| 2002/0162008 A1 | 10/2002 | Hill et al. |
| 2002/0174140 A1 | 11/2002 | Peake, Jr. et al. |
| 2002/0194470 A1 | 12/2002 | Grupe et al. |
| 2003/0009682 A1 | 1/2003 | Wallace et al. |
| 2003/0014659 A1 | 1/2003 | Zhu et al. |
| 2003/0018536 A1 * | 1/2003 | Eggebraaten | G06Q 30/06 705/26.81 |
| 2003/0028885 A1 | 2/2003 | Wilcox et al. |
| 2003/0046700 A1 | 3/2003 | Wilcox et al. |
| 2003/0048286 A1 | 3/2003 | Lal et al. |
| 2003/0050834 A1 | 3/2003 | Caplan |
| 2003/0061111 A1 | 3/2003 | Dutta et al. |
| 2003/0067493 A1 | 4/2003 | Jones et al. |
| 2003/0084315 A1 | 5/2003 | Krawetz et al. |
| 2003/0097597 A1 | 5/2003 | Lewis et al. |
| 2003/0101247 A1 | 5/2003 | Kumbalimutt et al. |
| 2003/0154131 A1 | 8/2003 | Tsang et al. |
| 2003/0177072 A1 | 9/2003 | Bared et al. |
| 2003/0191865 A1 | 10/2003 | De Armas et al. |
| 2003/0191971 A1 | 10/2003 | Klensin et al. |
| 2003/0217287 A1 | 11/2003 | Kruglenko et al. |
| 2003/0227487 A1 | 12/2003 | Hugh et al. |
| 2004/0003071 A1 | 1/2004 | Mathew et al. |
| 2004/0003072 A1 | 1/2004 | Mathew et al. |
| 2004/0003279 A1 | 1/2004 | Beilinson et al. |
| 2004/0006621 A1 | 1/2004 | Bellinson et al. |
| 2004/0015586 A1 | 1/2004 | Hegli et al. |
| 2004/0015702 A1 | 1/2004 | Mercredi et al. |
| 2004/0029567 A1 | 2/2004 | Timmins et al. |
| 2004/0034544 A1 | 2/2004 | Fields et al. |
| 2004/0034646 A1 | 2/2004 | Kimball et al. |
| 2004/0064480 A1 | 4/2004 | Bartlett et al. |
| 2004/0078565 A1 | 4/2004 | Hofmeister et al. |
| 2004/0103122 A1 | 5/2004 | Irving et al. |
| 2004/0162900 A1 | 8/2004 | Bucher et al. |
| 2004/0186989 A1 | 9/2004 | Clapper et al. |
| 2004/0249884 A1 | 12/2004 | Caspi et al. |
| 2004/0254855 A1 * | 12/2004 | Shah | G06Q 30/06 705/26.35 |
| 2005/0060566 A1 | 3/2005 | Chebolu |
| 2005/0065935 A1 | 3/2005 | Chebolu |
| 2005/0066290 A1 | 3/2005 | Chebolu |
| 2005/0081043 A1 | 4/2005 | Evans et al. |
| 2006/0178986 A1 | 8/2006 | Giordano |
| 2006/0242685 A1 | 10/2006 | Heard |
| 2007/0011057 A1 | 1/2007 | Archer et al. |
| 2007/0016695 A1 | 1/2007 | Rabbers |
| 2008/0046331 A1 | 2/2008 | Rand |
| 2014/0122564 A1 * | 5/2014 | Arora | H04L 65/4084 709/203 |

\* cited by examiner

| PROFILE | FRIDGE | GAMES | MUSIC | VIDEO |

PIZZA BARN'S MENU: SELECT ITEMS YOU WOULD LIKE TO BE MADE AVAILABLE FOR ORDERING

- ☐ LARGE CHEESE PIZZA
- ☐ MEDIUM CHEESE PIZZA
- ☐ SMALL CHEESE PIZZA
- ☑ CHILD'S CHEESE PIZZA
- ☑ DINNER SALAD
- ☑ BREADSTICKS
- ☐ 18-PIECE WINGS
- ☐ 12-PIECE WINGS
- ☑ 6-PIECE WINGS

- ☐ LARGE 3-TOPPING PIZZA
- ☐ MEDIUM 3-TOPPING PIZZA
- ☐ SMALL 3-TOPPING PIZZA
- ☑ CHILD'S 3-TOPPING PIZZA ← 810
- ☐ 20 OUNCE COKE
- ☐ 20 OUNCE DIET COKE
- ☑ 20 OUNCE LEMONADE (SUGAR FREE)
- ☑ 20 OUNCE BOTTLED WATER

| PROFILE | FRIDGE | GAMES | MUSIC | VIDEO |

JOHN: YOU ARE PRE-APPROVED TO:
 ORDER G-RATED MOVIES
 ORDER VIDEOS THAT HAVE BEEN SELECTED FOR AGE RANGE 7-9 YEARS OLD

1810

YOU HAVE BEEN RESTRICTED FROM:
 VIEWING VIDEOS THAT HAVE BEEN CLASSIFIED AS SWORD AND SORCERY

YOU MAY ORDER ONE VIDEO PER DAY

1820

AVAILABLE TITLES -- A

☐ APPLE PIE MYSTERY

☐ ASTRONAUT TALE

☐ AT THE BALLGAME

☐ AWESOME SUMMER

☐ AXEL -- THE MOUSE

CONTINUE TO MORE AVAILABLE TITLES -- B

FIGURE 18

METHODS, SYSTEMS, AND PRODUCTS FOR ORDERING ITEMS

CROSS-REFERENCE TO RELATED APPLICATIONS

This application is a Continuation of and claims priority to U.S. Patent Application Ser. No. 14/318,593 filed Jun. 28, 2014 and since issued as U.S. Pat. No. 9,342,847, which is a Continuation of and claims priority to U.S. patent application Ser. No. 12/500,658 filed Jul. 10, 2009 and since issued as U.S. Pat. No. 8,794,519, which is a Continuation of and claims priority to U.S. patent application Ser. No. 11/458,285 filed Jul. 18, 2006 and since issued as U.S. Pat. No. 7,575,163. The contents of each of the foregoing applications are hereby incorporated by reference into this application in their entireties.

TECHNICAL FIELD

The present disclosure is generally related to electronic communications and, more particularly, is related to interactive media.

BACKGROUND

Almost every home has a television today. With the advent of cable and satellite programming, a wide variety of channels are available on today's television sets. Further, today's technology allows media network operators to offer such services as home shopping, games, and movies on demand.

Generally, the downstream bandwidth from a content provider to a customer in television communications is large while upstream bandwidth is significantly less. Newer technologies and innovations have allowed the upstream bandwidth to become wider, thereby allowing for increased interactivity between the customer and a service provider.

In spite of the new advances, a television, like other appliances and media tools, has still remained more of a static-type of appliance that displays information, rather than a dynamic and interactive household tool that facilitates integral tasks within a household.

Thus, a heretofore unaddressed need exists in the industry to address the aforementioned deficiencies and inadequacies.

SUMMARY

Embodiments of the present disclosure provide systems and methods for interactive management of storefront purchases. Briefly described, one embodiment of the system, among others, includes a media server configured to transfer storefront interface data to a client device, where the storefront interface data enables a graphical storefront interface to be displayed on the client device. The graphical storefront interface enables a first user to communicate with the media server for the purpose of browsing graphical descriptions of items that are offered for sale. The graphical storefront interface further enables the first user to make purchases of offered items. The system further includes a profile database maintaining profile records of users of the graphical storefront interface. At least one profile record comprises a profile for an administrator of an interactive management service, where the administrator authorizes other users to participate in the service including the first user. Further, the administrator sets parameters maintained in the profile database that limit which items are displayed to the first user and offered for sale by the media server to the first user. Also, payment for items purchased by the first user are charged to the administrator.

Embodiments of the present disclosure can also be viewed as providing methods for interactive management of storefront purchases. In this regard, one embodiment of such a method, among others, can be broadly summarized by the following steps: comprising the steps of: displaying a virtual storefront guide, the virtual storefront guide enabling a first user to browse graphical descriptions of items that are offered for sale, the virtual storefront guide further enabled to allow the first user to make purchases of offered items; limiting which items are displayed to the first user and offered for sale on the virtual storefront guide in accordance with parameters defined by an administrator, the administrator authorizing the first user to participate in activities of the virtual storefront guide; and charging payment of purchases made by the first user to the administrator.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3-19 are diagrams of embodiments of interfaces to a virtual storefront guide, such as that shown in FIG. 2.

DETAILED DESCRIPTION

Figure 1:
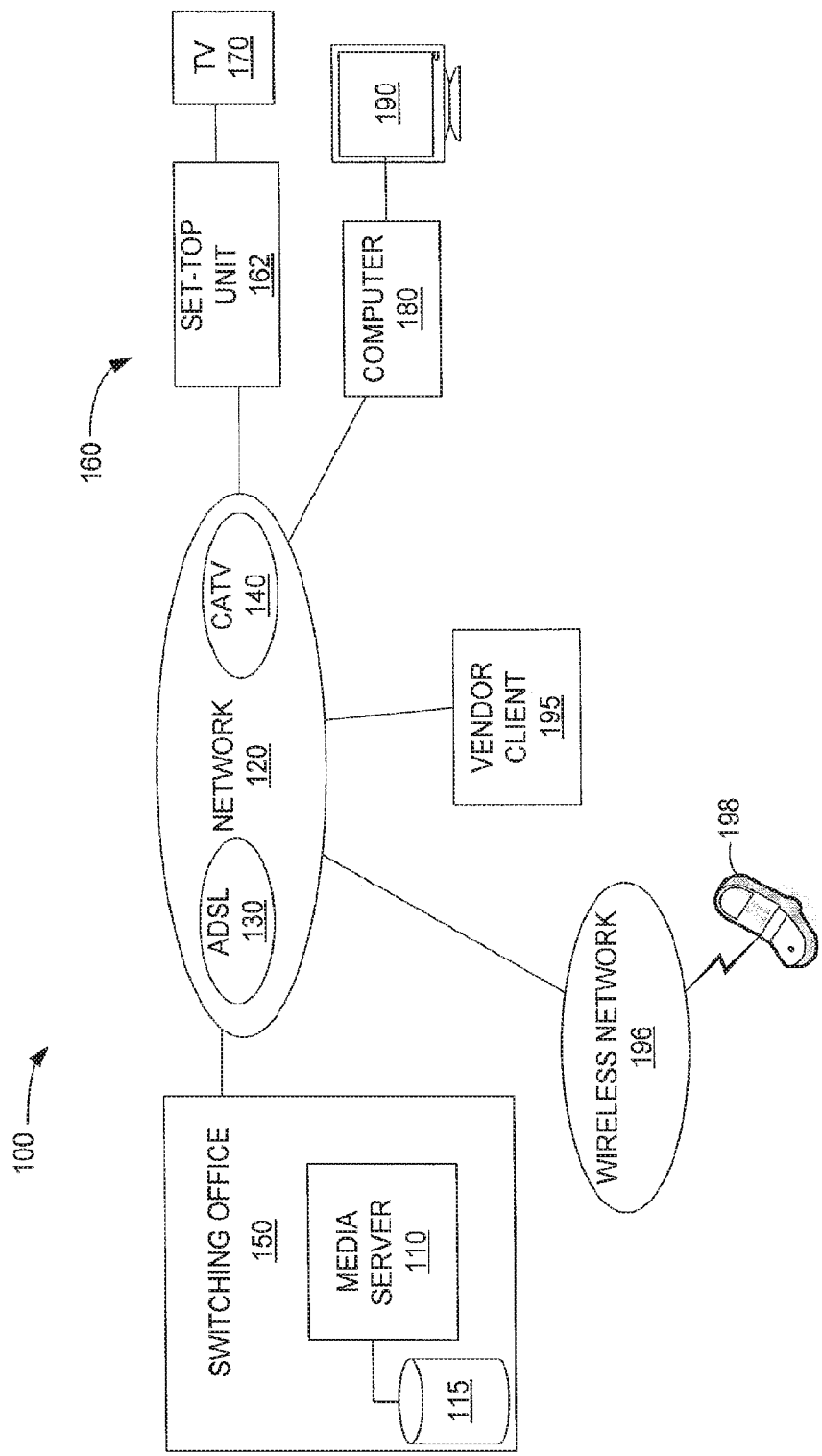
FIG. 1 is a block diagram of one embodiment of an interactive management system in accordance with the present disclosure.

One embodiment of an interactive management system is shown in FIG. 1. The interactive management system 100 includes a media server 110. The media server 110 is connected to a client device 160 of a user via a communications network 120. The media server 110 is network equipment that provides the storage for media program material (e.g., video, web pages, etc.), which can be requested by a user. In a cable communications environment, the media server 110 may comprises a video server that performs many functions, such as admission control, request handling, data retrieval, guaranteed stream transmission, stream encryption, and support of functions such as pause, rewind, and fast forward. In a web environment, the media server may comprise a web server that provides Internet content.

A communication network 120 connects the media server 110 and the equipment at a customer's premise (e.g., set-top device, personal computer, etc.). In some embodiments, the interactive management system 100 involves the transfer of large volumes of data at very high speed. Also, in some embodiments, a user may utilize more than one communication network 120 to access the media server 110. For example, a user could connect with the media server 110 utilizing the Internet to register for an interactive management service and establish profiles of authorized users that are maintained in database 115. Then, an authorized user could access available services of the interactive management service over a cable television network.

An Asymmetric Digital Subscriber Line (ADSL) system 130 is an asymmetrical bi-directional transmission system used as the local subscriber loop between the local telephone switch and the subscriber's home, thus allowing the economical transmission of broadband services without signal regenerators. In combination with the telephone signals, which may be analogue or digital (ISDN), control (e.g., 16 and 24 kbit/s) and video (e.g., 2 to 6 Mbit/s) information channel may be transmitted downstream towards the user. In the upstream direction there are at least telephone and control channels. In some embodiments, the communication network 120 may utilize an ADSL system 130 to provide Internet-based services to a customer's premises.

A cable TV (CATV) distribution system 140 is based on a tree-and-branch topology in some embodiments and on a star topology in some others. The audio and video signals are transmitted via coaxial cables in the subscriber line area. The trunk lines are usually made by fiber. Due to the high bandwidth, it has many channels available, which are multiplexed onto the cable using Frequency Division Multiplexing (FDM). Channel transmission on the cable is primarily unidirectional. Signals are inserted on the downstream channels by a head-end.

Signals from customer sites are allowed on upstream channels and they are transmitted towards the head-end. Also, there is provision for upstream message transmission. In some embodiments, the communication network 120 may utilize a CATV distribution system 140 to provide Internet-based services to a customer's premises.

A cable head-end is the facility at a cable TV center that originates and communicates cable TV services and cable modem services to subscribers. In distributing cable television services, the head-end includes a satellite dish antenna for receiving incoming programming. When a cable company provides Internet access to subscribers, the head-end includes the computer system and databases needed to provide Internet access.

A switching office 150 includes both the telephone company's central office and the cable company's head-end. It is the place where services are fed and distributed to individual subscribers. It contains the head-end, switches, and media servers 110. In the head-end equipment, the video streams are formatted and organized for transmission in the communication network. If ADSL 130 is used, the switching office 150 switches the video streams onto the subscriber loops with telephone calls.

A user interacts with the services by a client device 160, such as a set-top unit or a personal computer. In one embodiment, for a set-top unit 162, information is displayed to a user using a television display 170, while in the case of a computer 180, information is displayed to a user using a computer monitor 190.

A user may be connected to a media server 110 and browse through a selection of content or services. In one embodiment, the connection is over a cable television network. In another embodiment, the connection is over the Internet. Other embodiments may employ different mediums.

One method for transmitting video is the digital video broadcasting (DVB) protocol or standard. Alternatively, an increasingly popular method of transmitting digital video is IP Television (TV) because of the numerous advantages it provides for network providers to offer video services more efficiently in certain cases. For example, IPTV is suited for programs intended for use by only one subscriber, because a minimum amount of the network is tied up to serve that need. Therefore, the number of channels that can be carried to subscribers can be significantly higher when compared to traditional video delivery systems and depending on the transmission capacity of the network and how much of that capacity is devoted to IPTV. Finally, the same data transmission capacity of a network can be used for all other data traffic.

In an embodiment employing Internet Protocol Television, the interactive management system delivers digital television service to users using the Internet Protocol over a broadband connection through technologies used for the World Wide Web. IP video signals can be received by customer premise equipment as IP multicast streams delivered from the network. To avoid sending all channel signals simultaneously, each video channel can use a specific IP multicast identification and the customer premise equipment can signal to the network which channel the user is currently viewing or requesting. The signaling information can be carried using Internet Group Management Protocol (IGMP). Therefore, when a user changes the channel, the customer premise equipment can transmit an IGMP "join" message to the network for the new channel, and it can send an IGMP "leave" message for the original channel. The signaling information for the current channel can be transmitted to an IP-enabled set-top box 162 which relays the signal to a television set 170 or to a personal computer 180.

In one embodiment, the interactive management system 100 further includes one or more vendor clients 195. Via the vendor clients 195, a participating vendor or partner in the interactive management system 100 communicates with the media server 110 to program content that is distributed the users of the system. For example, in one embodiment, a vendor may be a participating restaurant that offers menu choices that are available for sale and may be displayed on a client device 160 of the user. A user may select items to purchase and the selections may be relayed to the vendor client device. Also, item selections or purchases may be tracked by the interactive management service so that appropriate billings may be made via credit card transactions or on monthly billing statements.

A wireless communication network 196 is coupled to the communications network 120 of the interactive management system 100. Accordingly, messages may be communicated from the communications network 120 to the wireless network 196 and a wireless device 198 of a user. For example, in one embodiment, a user of the interactive management system 100 may need authorization from another user administering the service, such as a parent (administrative user or administrator), before a purchase is allowed over a television set 170 of the user. Therefore, a message, such as a short message service type of message, may be communicated from the media server 110 to the wireless device 198 of the parent requesting authorization for the purchase. These and other details are further described in the example scenarios below.

Figure 2:
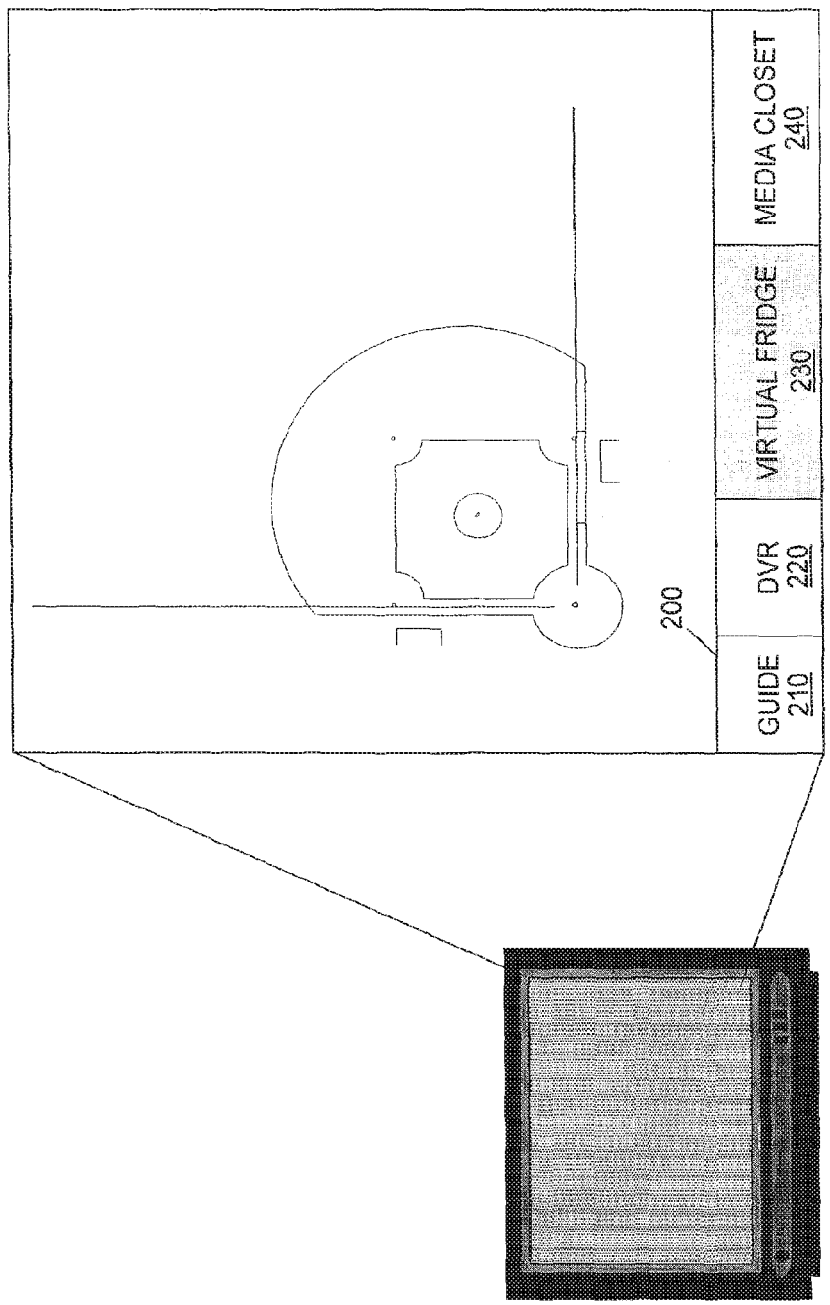
FIG. 2 is a diagram of an embodiment of a virtual storefront guide being displayed on a television set, such as that shown in FIG. 1.

For example, consider a scenario where an eight year-old child comes home from school. Both his parents are working and are not currently at home. The child desires a meal. He turns on the family's television set 170 with the remote control unit for a set-top box 162 connected to the television set 170 and a CATV network 140. The child presses a "Menu" button on the remote control unit that launches a virtual storefront guide 200 which is displayed on the bottom of the television set 170, as shown in FIG. 2. The child navigates the virtual storefront guide using arrow buttons on the remote control. For example, left and right arrow buttons can be used to navigate among the selectable channel "guide" 210, digital video recorder (DVR) 220, virtual "fridge" 230, and "media closet" 240 links or icons. In this scenario, the child highlights and selects the virtual fridge option 230.

This causes a prompt to be displayed for the user to enter his or her usercode. For example, a user profile associated with the user maintains a unique usercode associated with the user. By entering the correct usercode, the interactive management service can identify the user and can then apply rules that have been set for the user by an administrative user that established the interactive management service.

Figure 3:
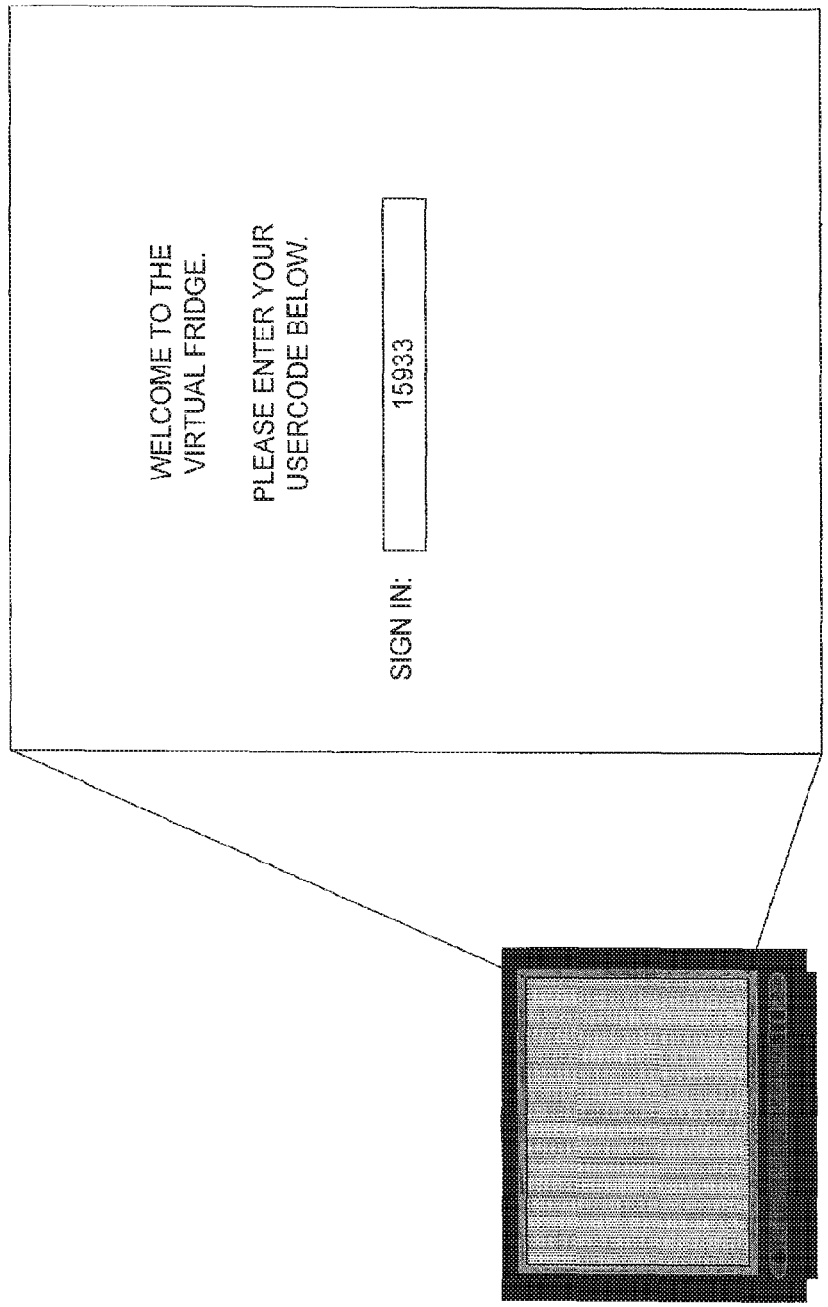
Figure 4:
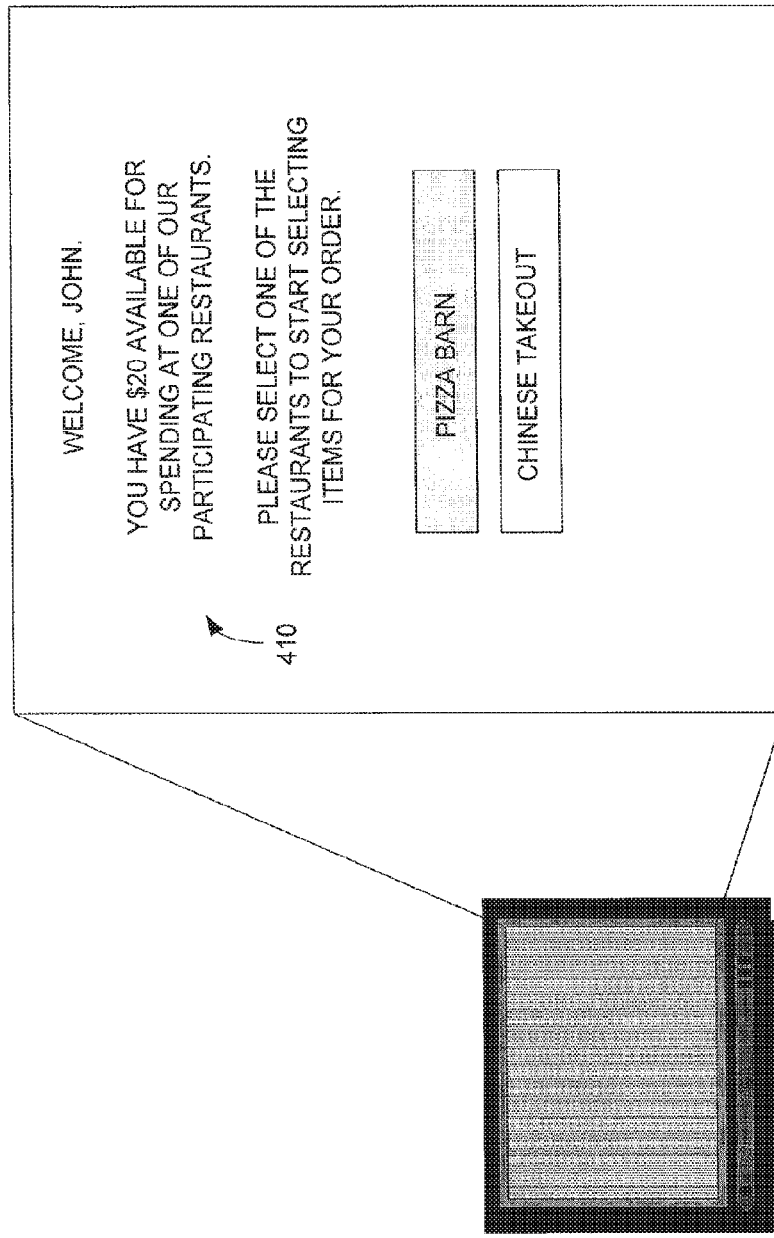

For example, in the present scenario, the user ("John") enters the code 15933, as shown in FIG. 3. After providing the usercode, the information is sent to the media server 110, and the media server 110 either recognizes the usercode as being that of an authorized user or not. If the user is authorized, the media server acknowledges the user with a greeting, such as "Welcome John," that is displayed on the user's client device 160. Also, the identified user is presented with current settings or restrictions 410 being imposed during his or her use of the "virtual fridge," as represented in FIG. 4.

The virtual fridge service is a food-ordering service that is facilitated by the interactive management service. Authorized users can not only purchase prepared food items using the interactive management service, but users who have administrative privileges can establish rules for other authorized users (or themselves) as to what items may be purchased, when these items may be purchased, how much purchasing power a user is provided, how many items may be purchased, how a user can receive approval to purchase items or amounts that have not been previously approved by the administrative user, whether promotional material or advertisements are welcomed, etc. Further, such criteria may be customized for different users or set as blanket rules. In the prior examples and the examples that follow, a "virtual fridge" implementation is described. However, the concepts disclosed herein can be extended to other purchasing approaches and items, some of which are expressly disclosed herein.

Referring back to the previous scenario, John is an authorized user of the interactive management service. However, John is not the administrative user who established the service. His mother is, and John's mother has set rules regarding John's use of the virtual fridge that are maintained in profile information.

For example, each of the authorized users may have a profile that is maintained by the interactive management service. In the profile, settings, rules, and biographical information may be maintained that allow the interactive management service to know how to invoke the interactive management service to carry out requested services. For example, the address of a user is maintained in his or her profile so that a participating vendor may be provided this information when the vendor is requested to deliver a purchased item to the user.

In the present case, John's mother has allocated a daily budget of $20 for John to spend on a meal. In this way, John's mother has pre-authorized John to spend $20 so that John does not spend more the mother desires. Further, John's mother may also pre-approve from which vendors John is able to select menu items. For example, John may be allergic to some types of seafood (although he still loves the taste). Therefore, John is not authorized to shop from "SeaFood Express." When John views the list of participating vendors, unauthorized vendors may be hidden from his view and not displayed. In some embodiments, limits 410 placed on the user may be displayed to the user, as shown in FIG. 4.

Figure 5:
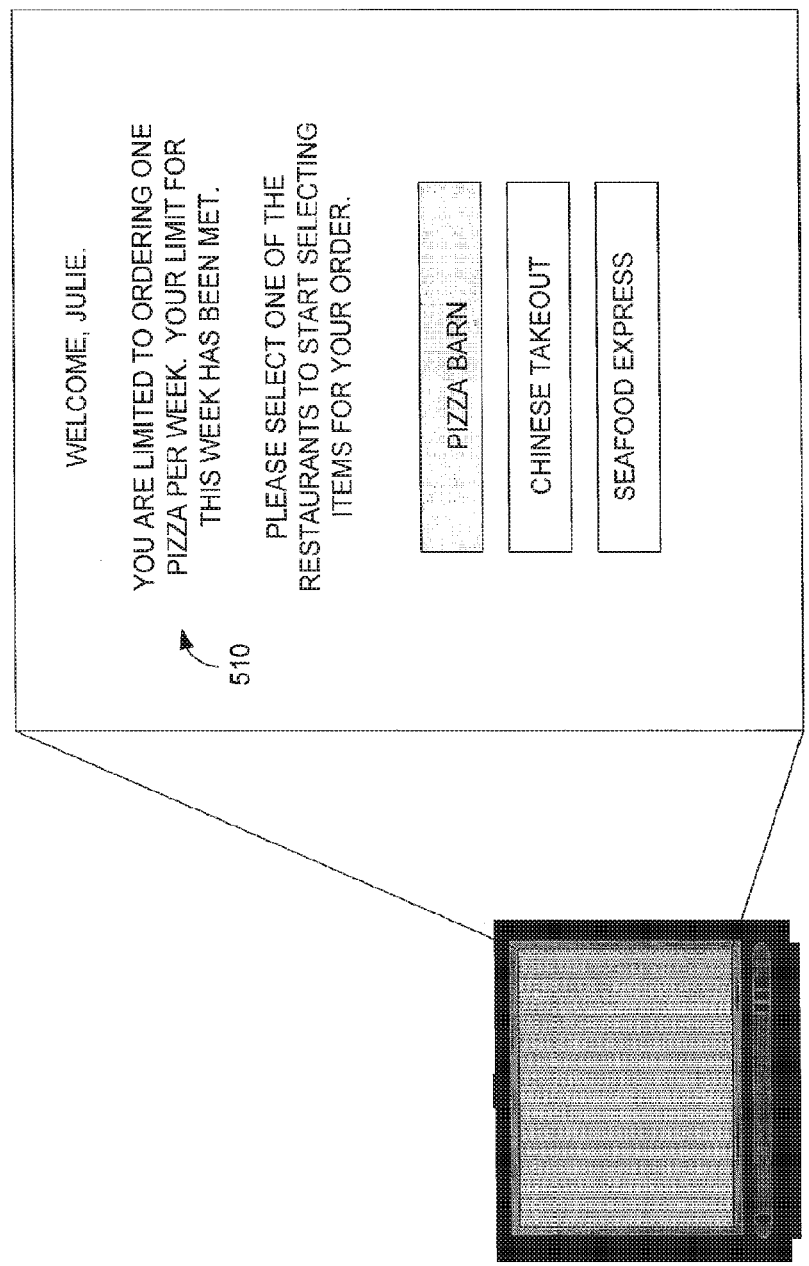

In the present scenario, John's mother has established a pre-approved set of items that John is allowed to order without any parent intervention. Similarly, John's mother may build a pre-approved set of items for John's sister, Julie. Accordingly, when Julie identifies herself as an authorized user, the media server 110 will present items and information that conforms to requirements established by her mother. For example, Julie's mother authorizes Julie to order pizza once a week in the set of rules established for Julie. However, if Julie ordered pizza yesterday, then the interactive management service may inform Julie that she is unable to purchase pizza, as shown by pointer 510 in FIG. 5. Further discussion regarding profile information is included in later passages, including the portion accompanying FIG. 6.

Figure 6:
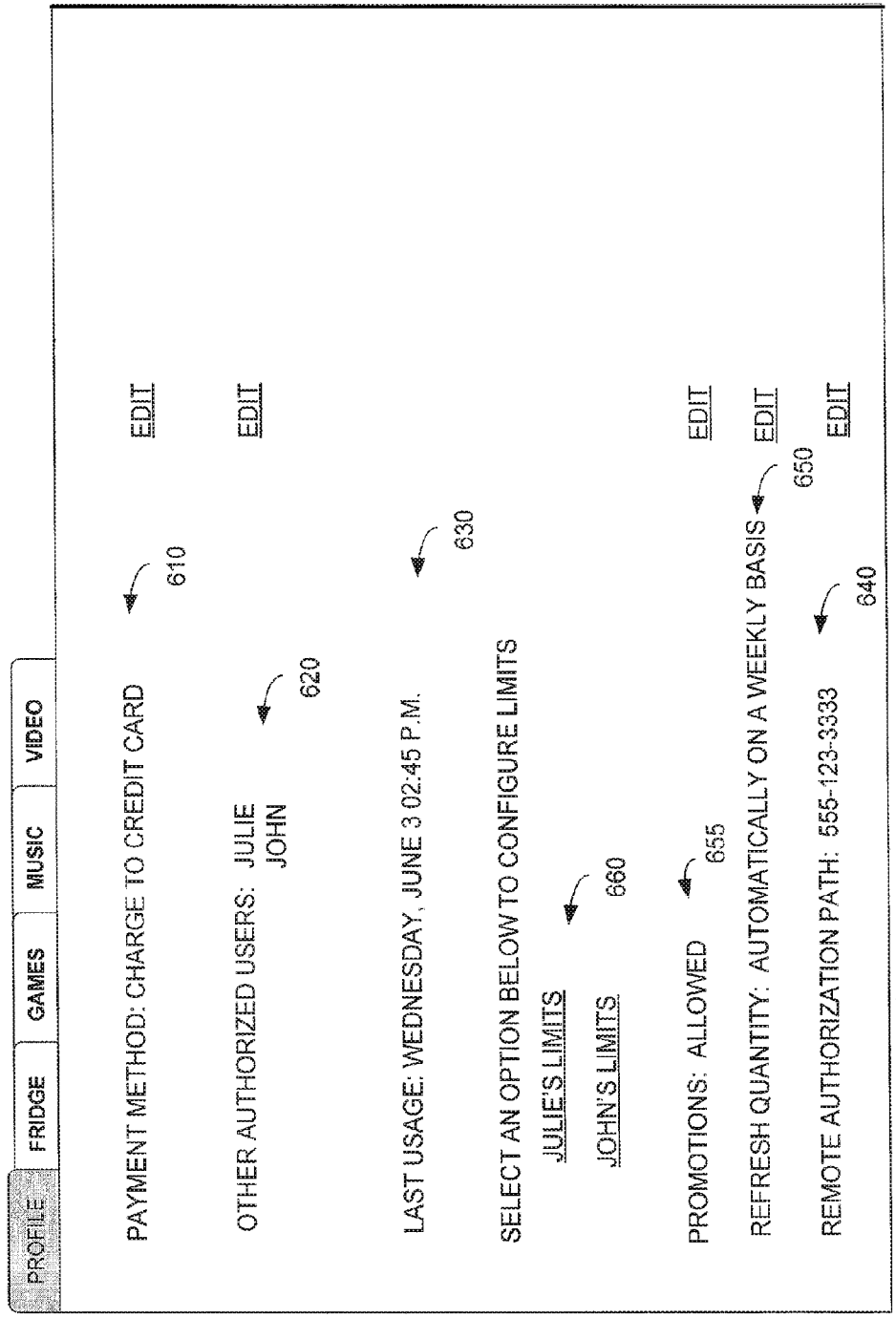

John and Julie's mother ("Betty") can set which menu items are available, quantity limits, number of days allowed to select item, time of day allowed to select item, individual price limits, etc. for the users that she has authorized to utilize the interactive management service. To facilitate this scenario, Betty is registered as an administrative user. Accordingly, Betty has a profile that is created by the interactive management service and stored in a database 115. Betty's profile may also list other users that are authorized to use the service, such as Julie and John, in some embodiments (as shown in FIG. 6). As an administrative user, Betty can set rules and settings on other users. In the above example, Betty has established what menu items are available to be selected by Julie and John.

FIG. 6 shows one embodiment of a guide of the interactive management service for setting up profile information. In the example shown, an administrative user may access the guide over a computer 180 and select checkboxes of items that are preferred by the user by positioning a cursor over the item and using a mouse control to select the appropriate checkbox. The profile information of Betty (the administrative user) indicates a method of payment. In the present example, purchases made through the service may be automatically charged to a credit card of Betty that is stored in the service's records, as shown by pointer 610. In some embodiments, Betty may have the option of choosing to have service charges billed on a monthly statement that is provided to her, such as her monthly cable bill. In this way, items purchased by John and Julie are automatically billed on behalf of Betty or whomever has authorized for payment.

In the example shown in FIG. 6, other profile information indicates that Julie and John are listed as authorized users under Betty's interactive management service (see pointer 620). The last usage of the service occurred on Wednesday, June 3rd at 2:45 p.m. (see pointer 630). The address or path to send requests for authorizations of purchases is at the telephone number 555-123-3333 (see pointer 640), budgetary values should be refreshed on a weekly basis for authorized users (see pointer 650), and promotions are allowed to be received by authorized users (see pointer 655). To modify a current setting, an Edit link is provided next to each setting that is able to be changed. Also, links are provided for launching an interface to specify limits for Julie and John (see pointer 660).

Figure 7:
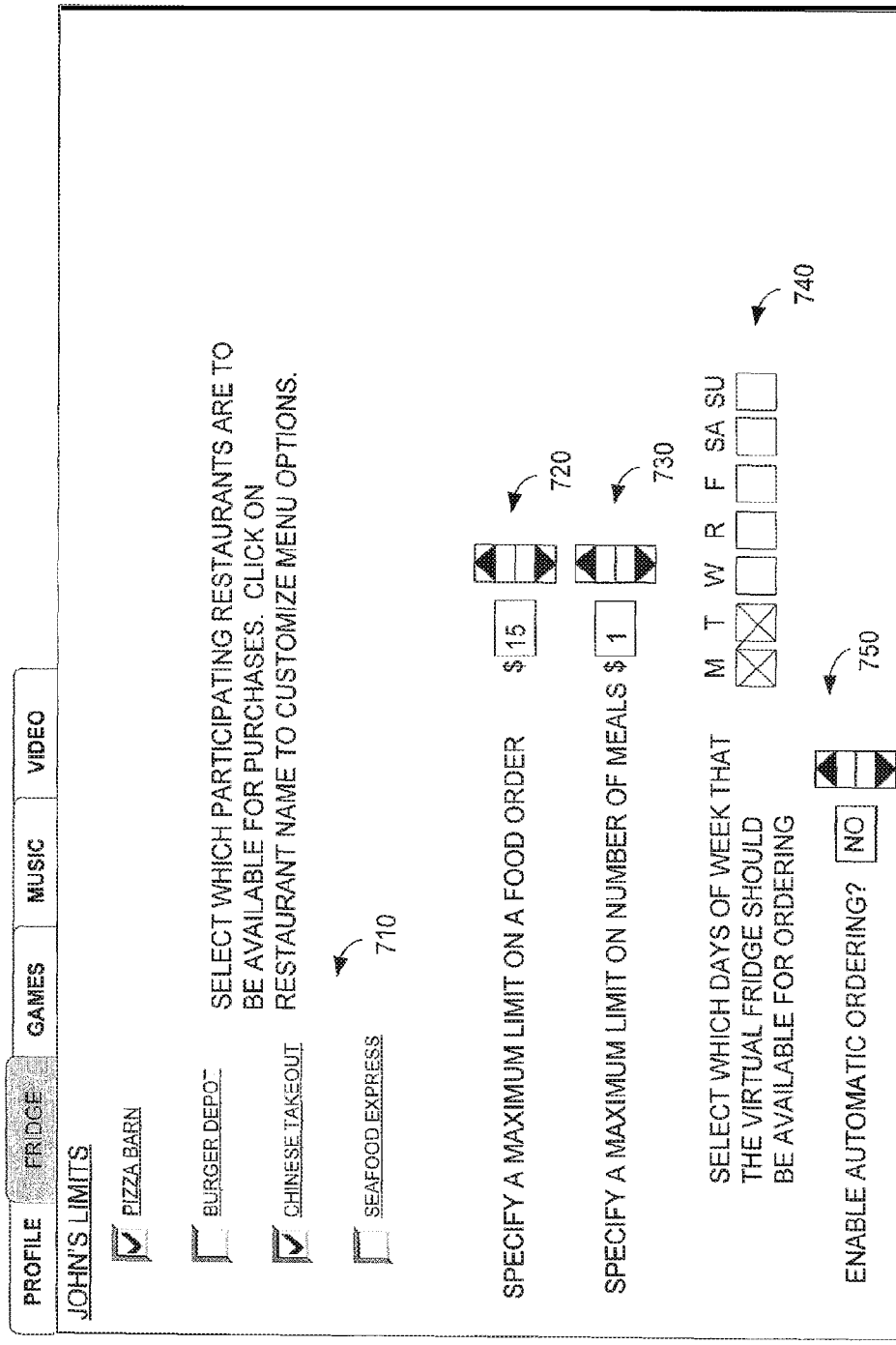

For example, FIG. 7 shows an embodiment of an interface for specifying purchasing limits for John for the virtual fridge service. Accordingly, Betty may click on checkboxes next to items that she authorizes or approves John to browse and purchase items from. In the example shown, Betty authorizes John to shop from Pizza Barn and Chinese Takeout vendors (see pointer 710). Also, in the example shown, Betty has specified a maximum monetary limit of $15 for a food order by John (see pointer 720) and John can only order one meal in each order (see pointer 730). Further, Betty has specified that John is only able to make purchases on Monday and Tuesday of each week (see pointer 740). Also, Betty has not activated automatic ordering (see pointer 750). Therefore, if John does not place an order, an order will not automatically be placed for him on Monday and/or Tuesday.

FIG. 8 shows additional options that may be customized by the administrative user, in one embodiment. For example, an administrative user may choose which items offered for sale by a vendor is available to purchased by an authorized user. In the example shown, Betty is choosing which menu items from Pizza Barn should be made available to John when he browses the offerings of Pizza Barn using the virtual fridge interface. Here, Betty has approved John to possibly purchase an assortment of child size pizzas, dinner salad, breadsticks, small order of wings, and lemonade and water beverages (see pointer 810). The items not checked by Betty will not be presented to John when he browses the offerings of Pizza Barn, in some embodiments. While the embodiments illustrated in FIGS. 6-8 utilize a web-based environment to access profile information, some embodiments access profile information over other communication platforms, such as that involving the set-top unit or box 162.

In addition to tailoring what options are available to a user, an administrative user may set a time frame for when the virtual fridge service is active and available to a user in some embodiments. For example, a dinner food menu may be available between 6-8 P.M., etc. and/or an administrative user may configure the availability of the dinner food menu to vary by day of the week for a user.

Also, in some embodiments, an administrative user is able to automatically add items to an order based no established rules. For example, a user may designate items or amounts that can be added to an order by selecting a "Add Favorites" option, for example, where certain items or amounts have been designated as being favorites by the administrative user. Alternatively, or in addition to, rules may be set up by the administrative user such that a six pack of soda always comes with the first order placed for the week, or if a pizza is ordered on a Friday, then a half gallon of ice cream is automatically ordered along with an order for a video rental.

Figure 9:
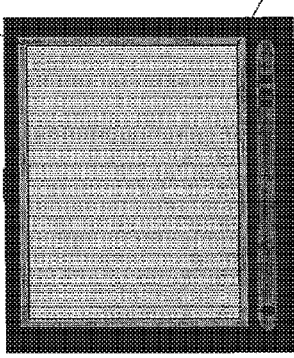

In summarizing some of the events that have transpired in the present scenario, John has turned on the television set 170, selected the virtual fridge icon on a virtual storefront guide, and sees the limits imposed by Betty. Certain selected vendors or companies may be shown along with what is allowed to be purchased from the companies, as shown in FIG. 4. John selects Pizza Barn 410 by scrolling through the available options using the arrow keys of the remote control to the set-top unit 162. In a next screen, as shown in FIG. 9, menu items for Pizza Barn are shown that have been pre-approved by Betty. As John selects menu items, such as a child's cheese pizza, by scrolling through the items using the arrow keys of his remote control unit and pressing a "select" key on the remote control unit, the remaining money left in his daily budget is visually updated on the screen, so that John knows how much money he has left to spend (see pointer 910). After John finishes choosing items for his meal, John can submit his order for processing by selecting the Submit option 920. The order is forwarded to a vendor client 195, such as a computer at Pizza Barn's retail establishment so that it may be received and processed.

Figure 10:
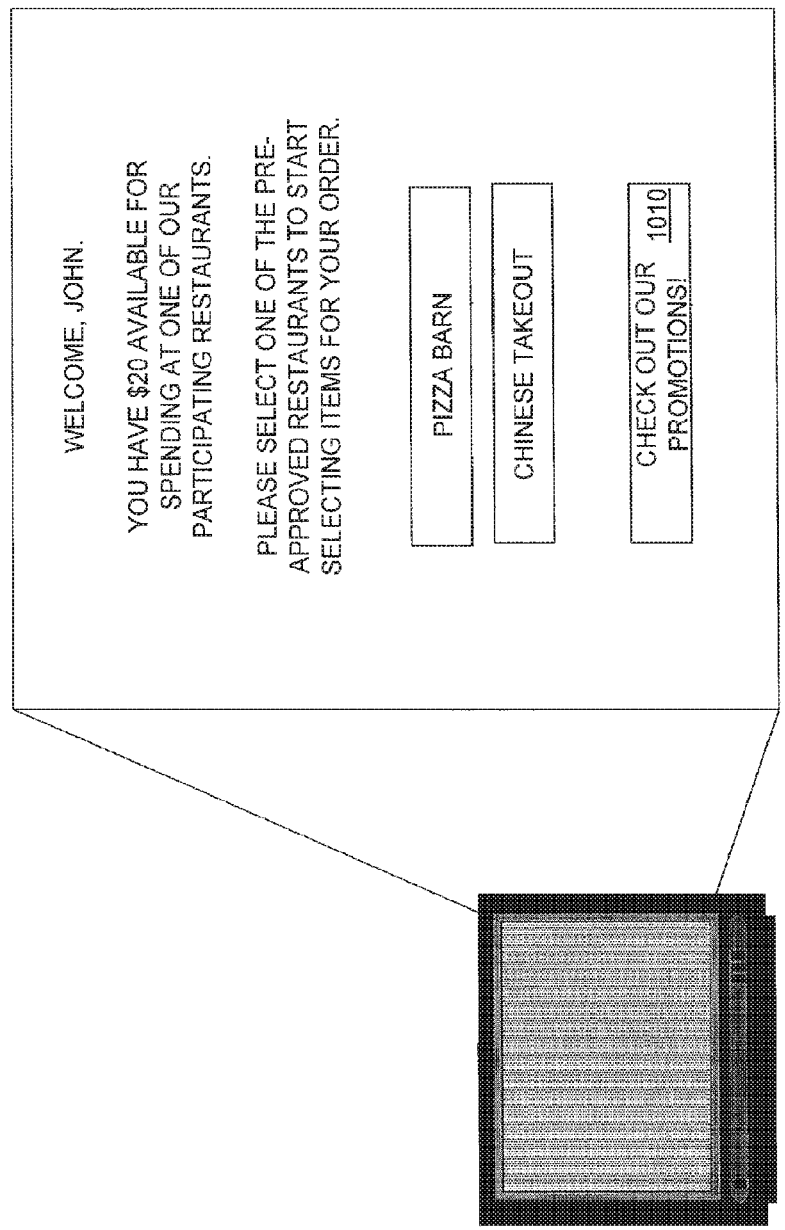

In some embodiments, it may be that John and Julie are able to view special offers or promotions by activating a link 1010 or icon on the virtual fridge interface, as shown in FIG. 10. For example, Pizza Barn may have a special of 3 child pizzas for $10.00. However, John is only authorized to purchase one child's pizza according to parameters set up by Betty.

Figure 11:
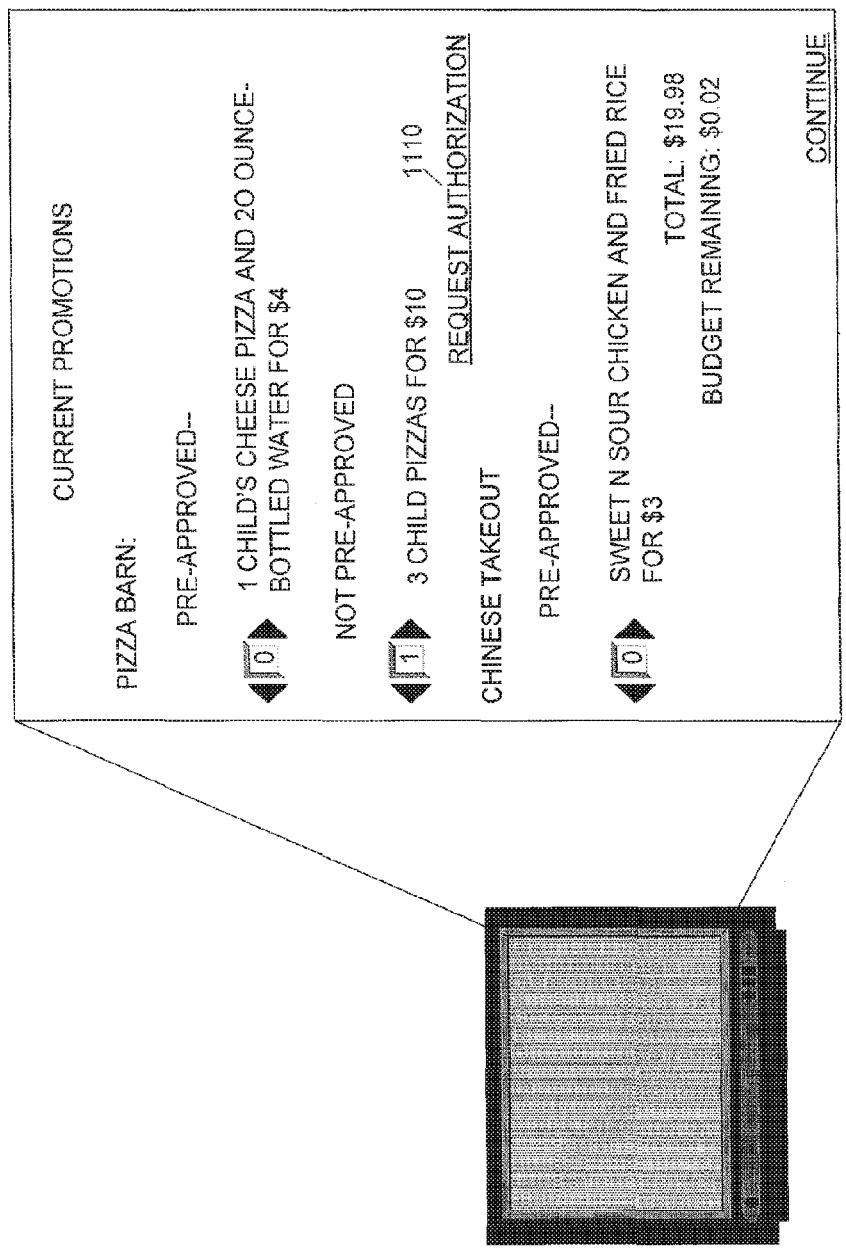

To purchase an item, quantity, price, etc. that has not been pre-approved, a user, such as John, can submit a request for authorization to the administrative user or whomever the administrative user has assigned to answer the request, in some embodiments. Therefore, John may select the request authorization option 1110 using the arrow keys of his remote control and pressing a select button, as represented in FIG. 11.

Figure 12:
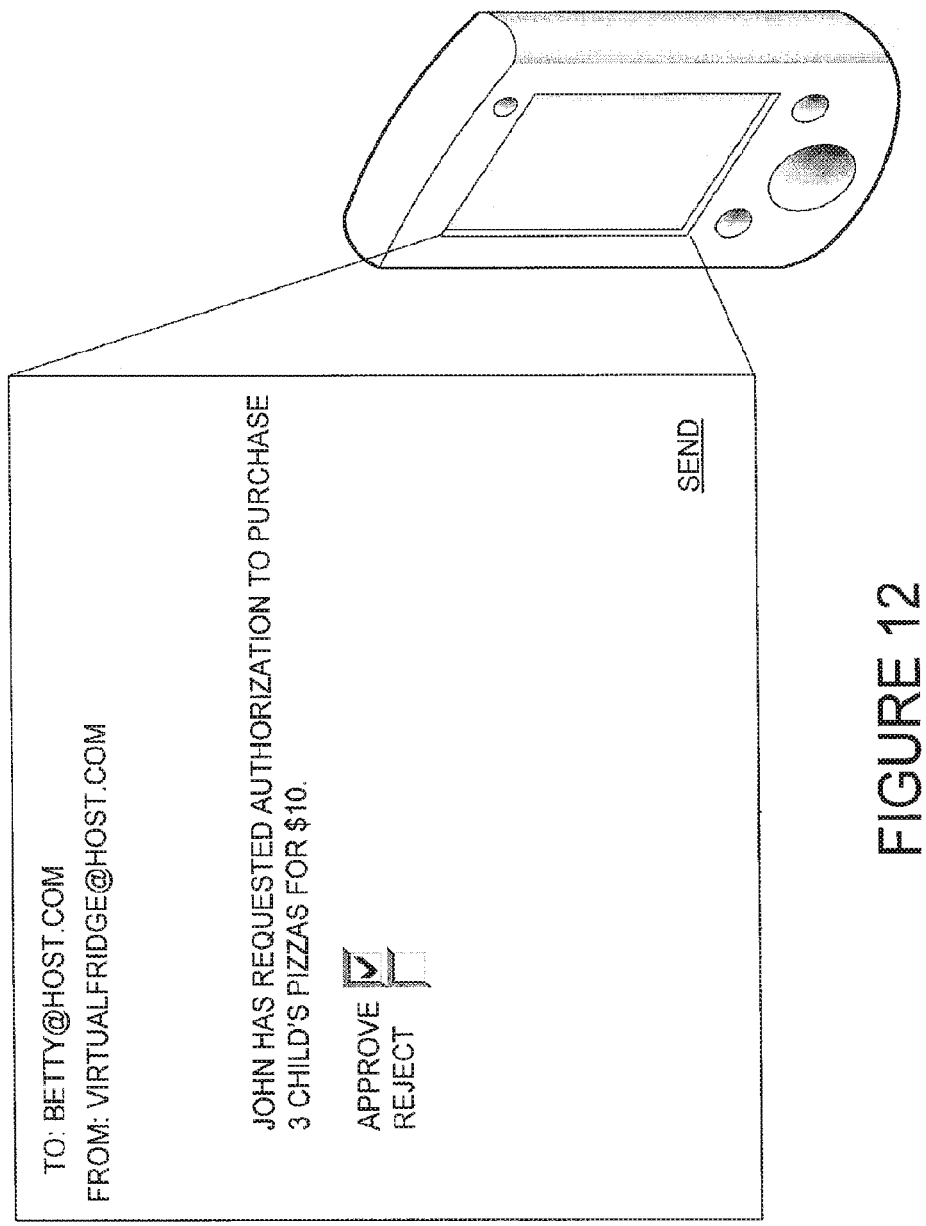

The authorizing user is then sent a message to an address or path of a wireless device 198 (such as a personal digital assistant) identified in the profile record (of FIG. 6, see pointer 640) over the wireless network 196. For example, a short message service (SMS) message may be sent asking the recipient to reply with a yes or a no to a request to authorize purchase of the 3 child pizzas, as shown in FIG. 12.

Figure 13:
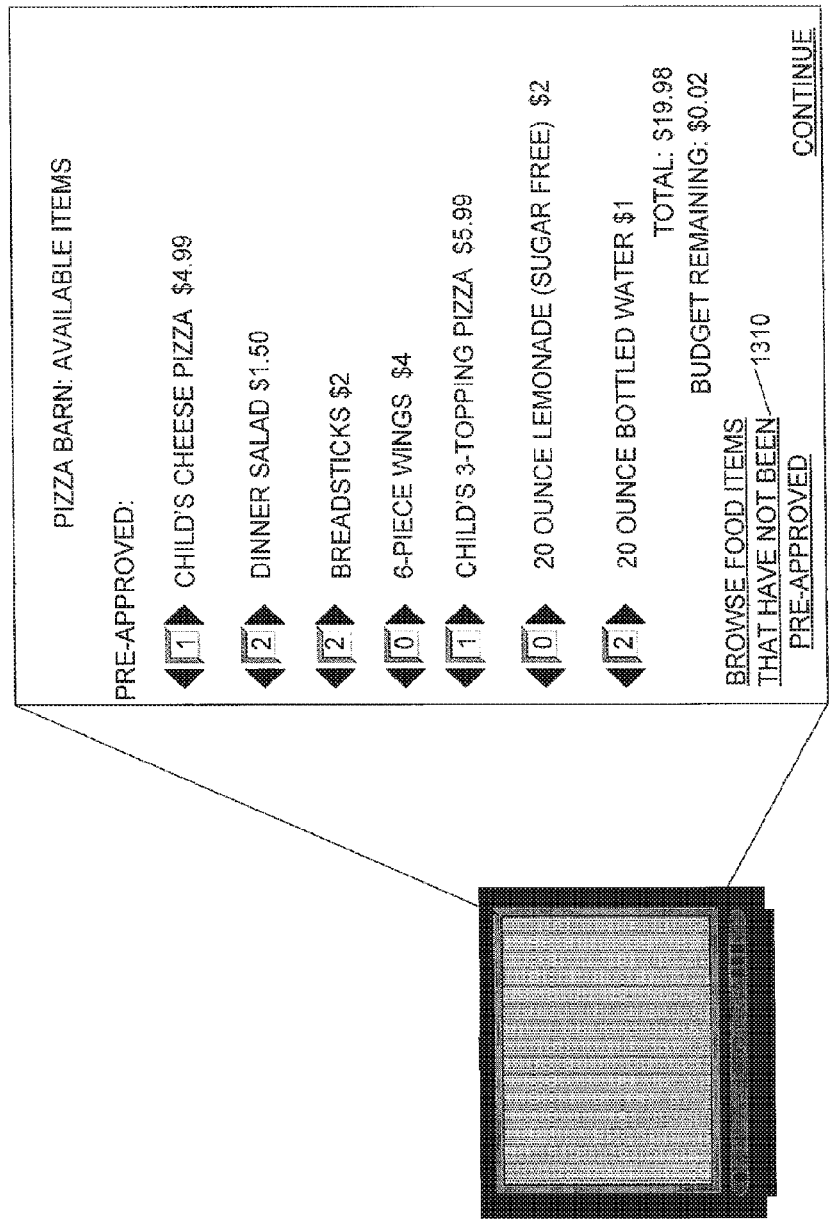
Figure 14:
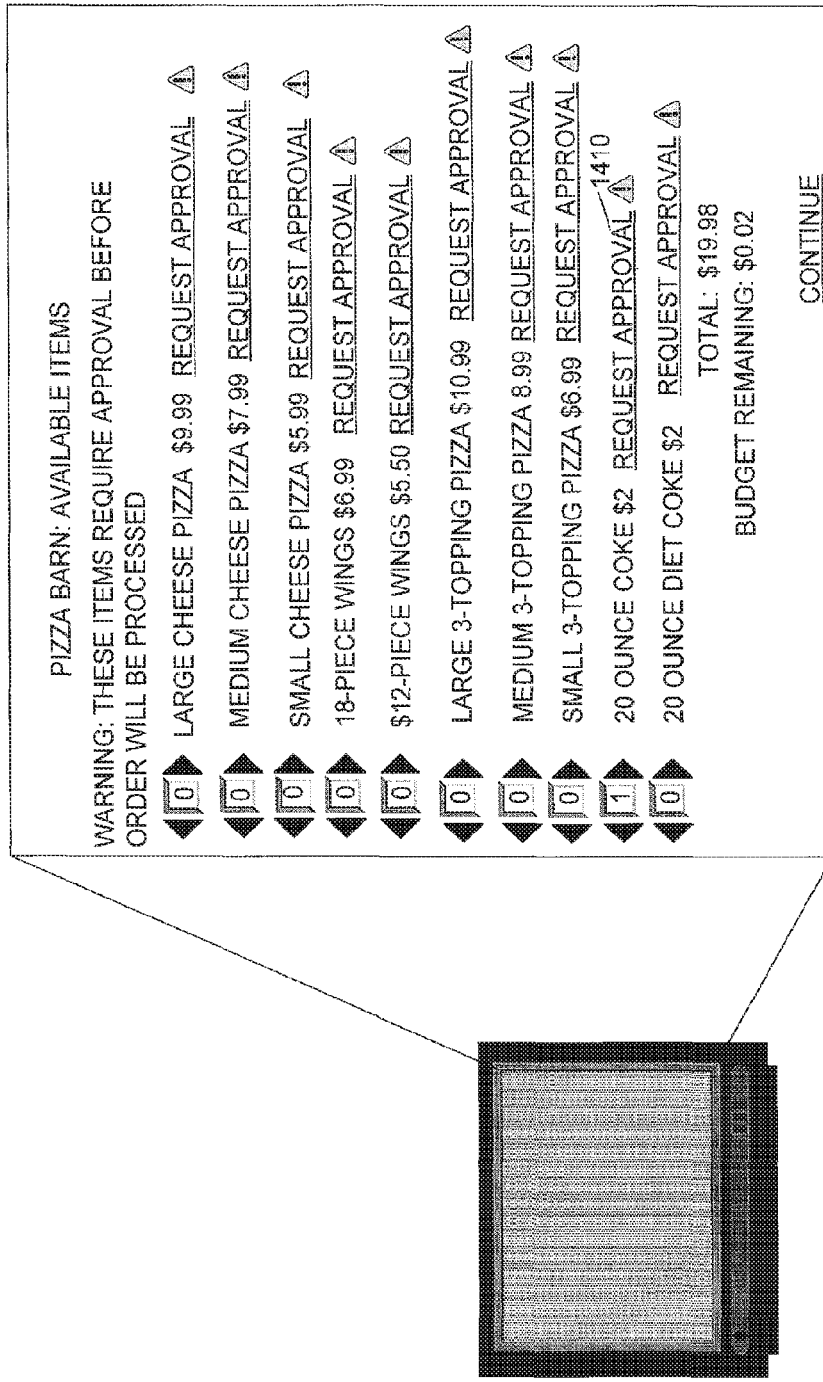
Figure 15:
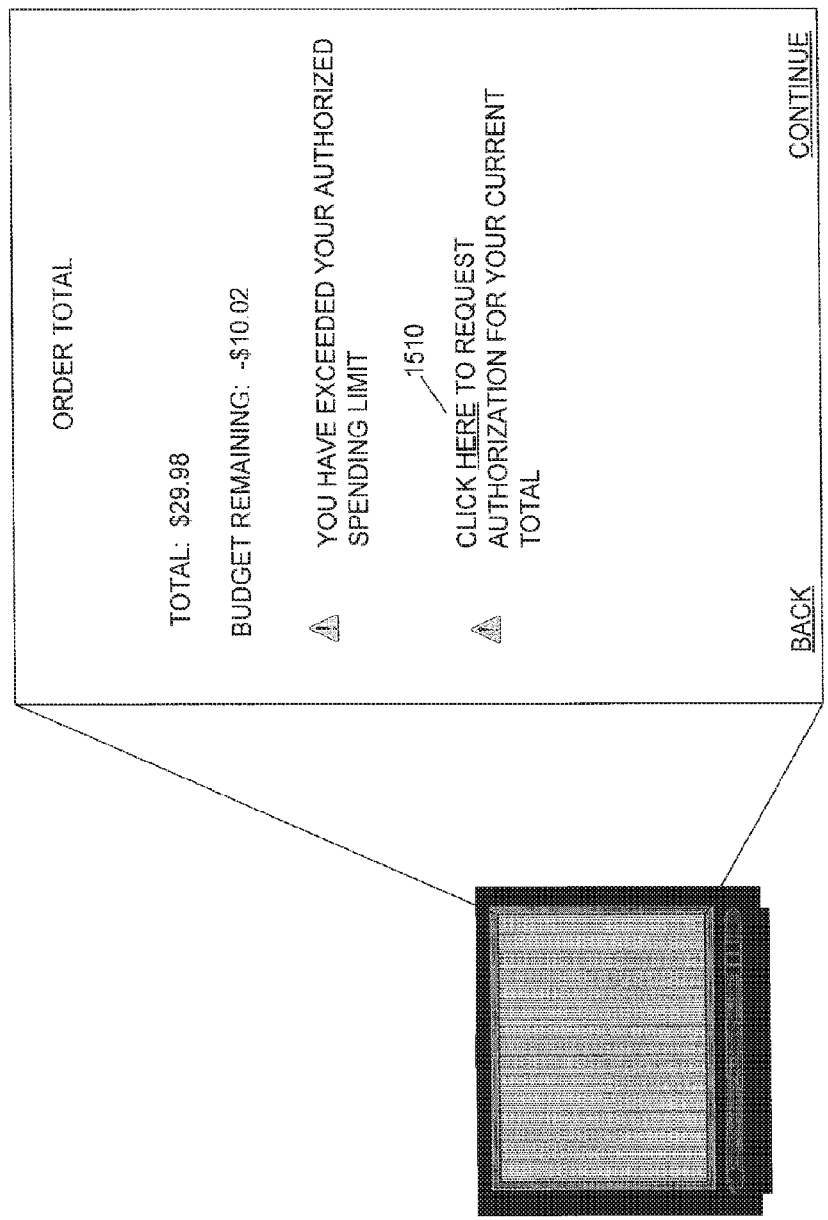

Previously, it was mentioned that some embodiments hide from view items that are not approved for purchasing by a current user. However, in some other embodiments, an authorized user is allowed to view items that have not been pre-approved by the administrative user. For example, FIG. 13 shows an interface display of menu items with an option 1310 at the bottom of the screen to view non-approved items. By selecting the option 1310, menu items from the participating vendor are shown that have not been pre-approved by the administrative user, as shown in FIG. 14. By specifying a quantity for one of the items and selecting the Request Approval link 1410, a request is sent to the administrative user on to a designated address or path contained in the administrative user's profile, as described with regard to FIG. 12. Also, if the current user's order exceeds a limit being imposed on the user, the user will be notified of the situation, as shown in FIG. 15, and may be provided the option 1510 of requesting the administrative user to authorize the transaction.

When a reply is received by the interactive management service in response to the authorization request, the status of the order will be updated and relayed to the user whenever the user accesses the interactive management service. For example, if the request is approved, then the items will be placed in John's order and the amount of available money he has left to spend will be updated. If the request is not approved, then the items will not be placed in John's order and John will be able to select additional items.

In some embodiments, an authorized user may select in advance what items he or she would like to receive at a later date. Therefore, a user could select in advance menu items for next week or next month, for example. In some embodiments, this is a feature that may require activation by the administrative user.

Figure 16:
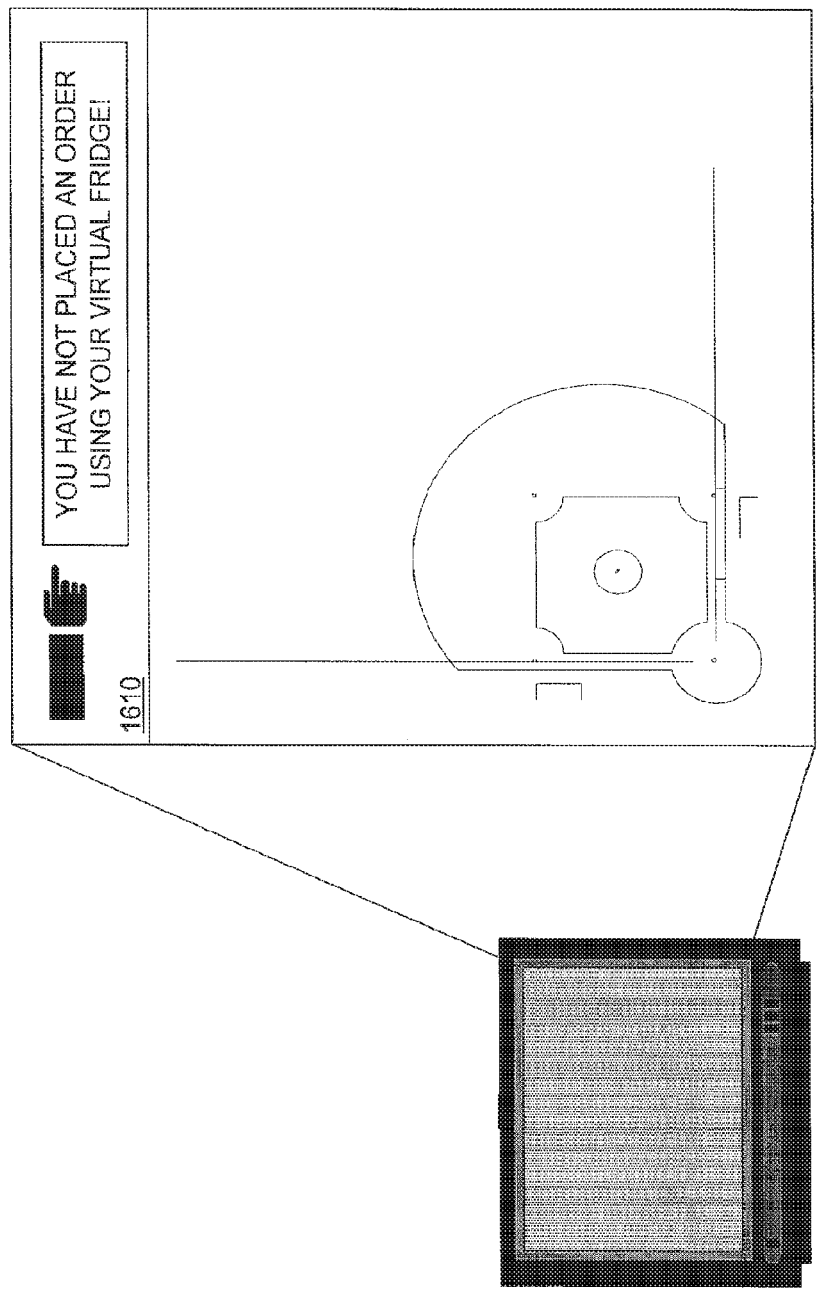

In accordance with the above scenario, the interactive management service may display a reminder 1610 on a television screen or computer screen if a user has neglected to place an order for a scheduled meal and a connection is established with the media server 110, as represented in FIG. 16. In this way, the interactive management service can help manage items of interest for the user. Likewise, a display may be shown to remind the user of what purchased items are scheduled to be delivered to the user.

Also, in some embodiments, the media server 110 may push alerts to a user via the set-top box 162 or a cell phone to prompt the user that it is meal time and the user needs to place an order. Further, in an embodiment, where an alert appears on a television screen, icons may also be displayed to allow for quick navigation to the portion of the storefront guide interface that allows for ordering of the item that is the subject of the alert (e.g., virtual fridge).

Advantageously, an administrative user, such as a parent, may arrange for a variety of budgetary methods to be used during utilization of the interactive management service by the users authorized to access the interactive management service. For example, the administrative user may limit another user's spending in accordance with a weekly amount. For example, in the above scenario, John may be limited to spending a $100 per week on meals and it is up to John to determine how that money is spent. Therefore, if John only has $5 left on the last day of the current week, than John has likely learned a lesson in budgetary spending and responsibility. Accordingly, an administrative user may set budgetary limits that provide degrees of discretionary or nondiscretionary control (e.g., $100/week versus $10/day). Further, in some embodiments, a hybrid plan may be employed where a user is provided a daily amount for certain items (some discretionary control), such as main course items and a weekly amount for other items (more discretionary control), such as dessert items. In this way, a user may be able to spend $8/week on dessert items, such as ice cream or candy.

In some embodiments, users may register themselves or other users with certain meal plans. In this way, participating vendors can target packages fitting the plan of the user. For example, if a user is in a kid's meal plan, then meals targeted toward "kids" are offered by participating vendors. Likewise, if a user is in a "diet plan," then low-calorie meals may be targeted to the user. Also, if a user is in a "budget plan" then low-priced meals may be targeted to the user. One of the benefits for a vendor is that they can market meals (or items in general) to users that have been pre-approved to spend a set budget.

In this way, an administrative user, such as a parent, can set controls on what items may be purchased, on what limits on purchase amounts are imposed, and on what payment methods are allowed or instituted. Authorized users act as proxies for the administrative user in making purchases on the behalf of the administrative user, and the administrative user institutes control measures on what purchases he or she allows to be made. Likewise, the administrative user may elect to place controls and limits on items that are selected to be purchased by the administrative user himself or herself. Also, in accordance with subscribing to plans of services, an authorized user may upgrade to a plan that allows for additional services or an increased limit on what services are available or downgrade to a plan that has reduced services or a reduced limit on what services are available.

Referring back to the scenario with John coming home and his parents away at work, Betty may arrange for a meal to be automatically ordered if John neglects to select his meal for the day, in some embodiments. As previously mentioned, this information may be maintained in a profile for John. Therefore, rules may be specified that indicate if John has not provided a menu selection by 5 p.m., the interactive menu service should automatically select a meal for John from one of the available pre-approved menu items, in one embodiment. Alternatively, Betty may specify a default menu item, such as a hamburger (John's favorite food), that is to be automatically ordered.

Also, an authorized user's pre-approved payment limit or quantities may be automatically set to be refreshed on a periodic basis (e.g., every week, month) or may be set to be refreshed manually. For example, at the end of a week, John may be out of money in his budget that allocated by his mother for use on the virtual fridge. Betty, as administrative user, may specify in John's profile that the budget should be "refreshed" automatically, such that at the beginning of the next week, the budget is returned to its initial value. Alternatively, Betty may specify that the budget amount should be refreshed or modified manually, since she may not want John to regularly make meal purchases using the interactive management service.

Figure 17:
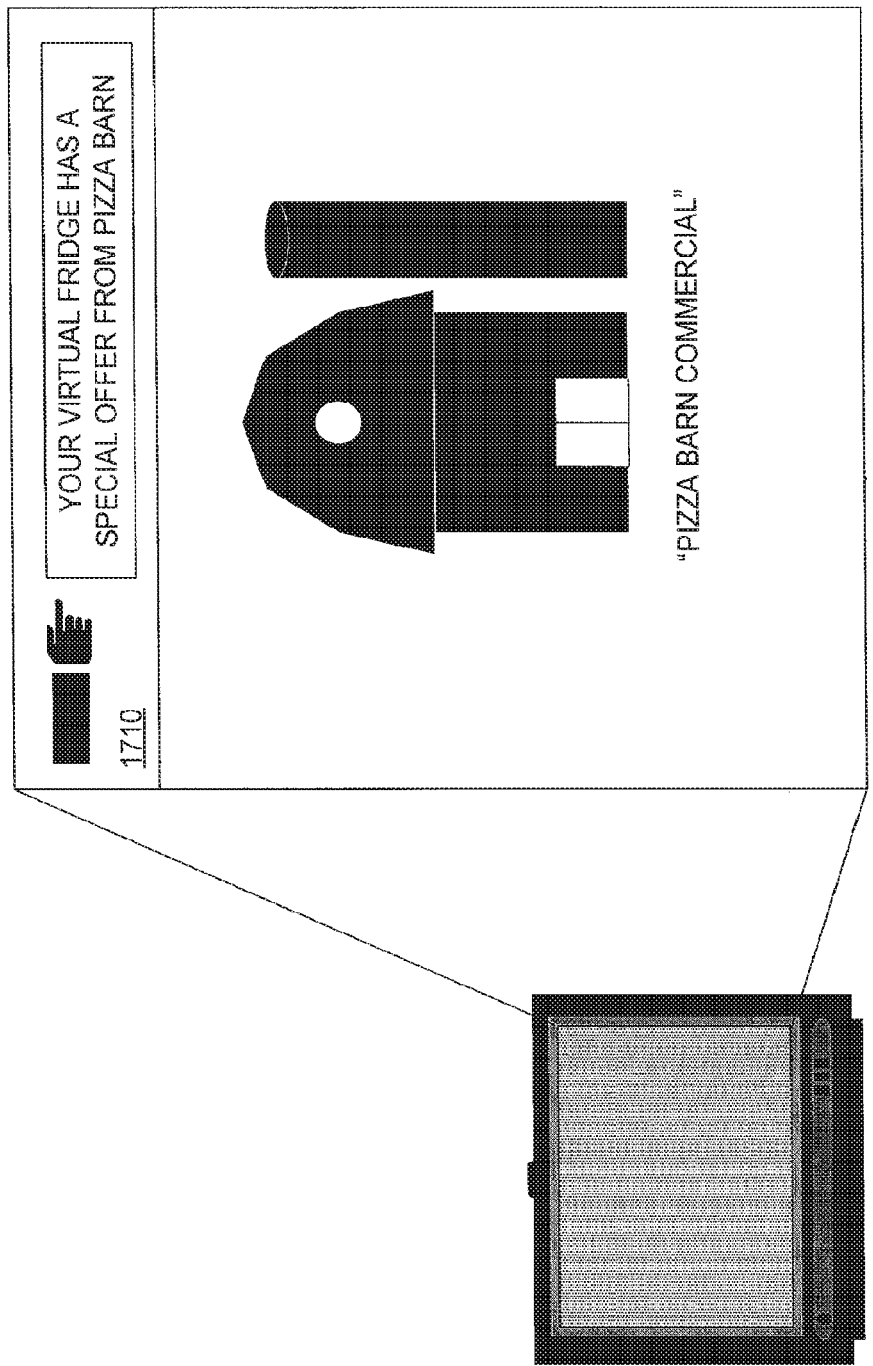

In some embodiments, participating vendors may track which of their items are being ordered by users and then present special packages or offers to users that fit the criteria of a user's current limits, budgets, or plans and ordering trends. Additionally, if a television advertisement for a participating vendor is being shown on the television set 170 for Pizza Barn, a message 1710 may also be displayed on the screen indicating that Pizza Barn is a featured vendor in the user's virtual fridge, as represented in FIG. 17. In embodiments where a user accesses the virtual storefront guide using a web browser, instead of television commercials or advertisements, Internet advertisements may cause a message to be displayed prompting a user to visit the storefront to view items of a vendor that is also the subject of an Internet advertisement.

Embodiments of the present disclosure are not limited to only having a virtual fridge and related items being offered by the interactive management service. For example, a "virtual storefront" of items, services, and vendors may be available for browsing and purchasing, as represented in FIG. 2. In a similar manner as a meal may be purchased by a user, a user may also browse for videos to rent or purchase, music to rent or purchase, games to rent or purchase, shop for tickets to movies, concerts, and other items of interest, which are depicted as being part of the "Media Closet" 240 of the virtual storefront 200 interface or guide. Accordingly, an administrative user may specify in a profile of authorized users, limits or criteria on which items may be purchases and on what amount may be spend on these items. Accordingly, certain categories of items (e.g., music versus meals) may have different rules or limits specified. Also, depending on the type of item, certain limits may be applicable across item type or category or may be applicable to a particular item type or category. For example, limits for music may be selected based on music genre (e.g., rap, rock, pop, etc.) and content ratings (e.g., contains explicit lyrics, does not contain explicit lyrics) that are not applicable to meal items. Further, a video game may be able to be purchased, downloaded to a set-top box 162 (or computer 180), but not able to be played until the administrative user gives approval. Approval may then be provided at the set-top box 162 or computer 180 where it is to be played or may be remotely provided by a wireless device in a similar manner, as previously described with regard to selecting a non-approved item in the virtual fridge scenario and subsequently receiving approval or authorization for the administrative user.

The administrative user may also decide to blanketly or across the board allow or prohibit promotions or advertisements to be received for each service (e.g., meals, music, movies/videos, etc.) offered in the virtual storefront interface, as denoted by pointer 655 in FIG. 6.

While many of the examples discussed above have been explained in a context using a television set 170, it is contemplated that these examples may also be extended to a context utilizing a computer 180 communication via the Internet. For example, a computer 180 may communicate with a media server 110 and purchase and receive items, such as meals, movies/videos, music, etc. that satisfy criteria maintained in a user profile, as described above. It is contemplated that a computer 180 may be employed by a user in a similar manner as a set-top unit 162 and television set 170, in the examples above, in one or more embodiments.

Figure 19:
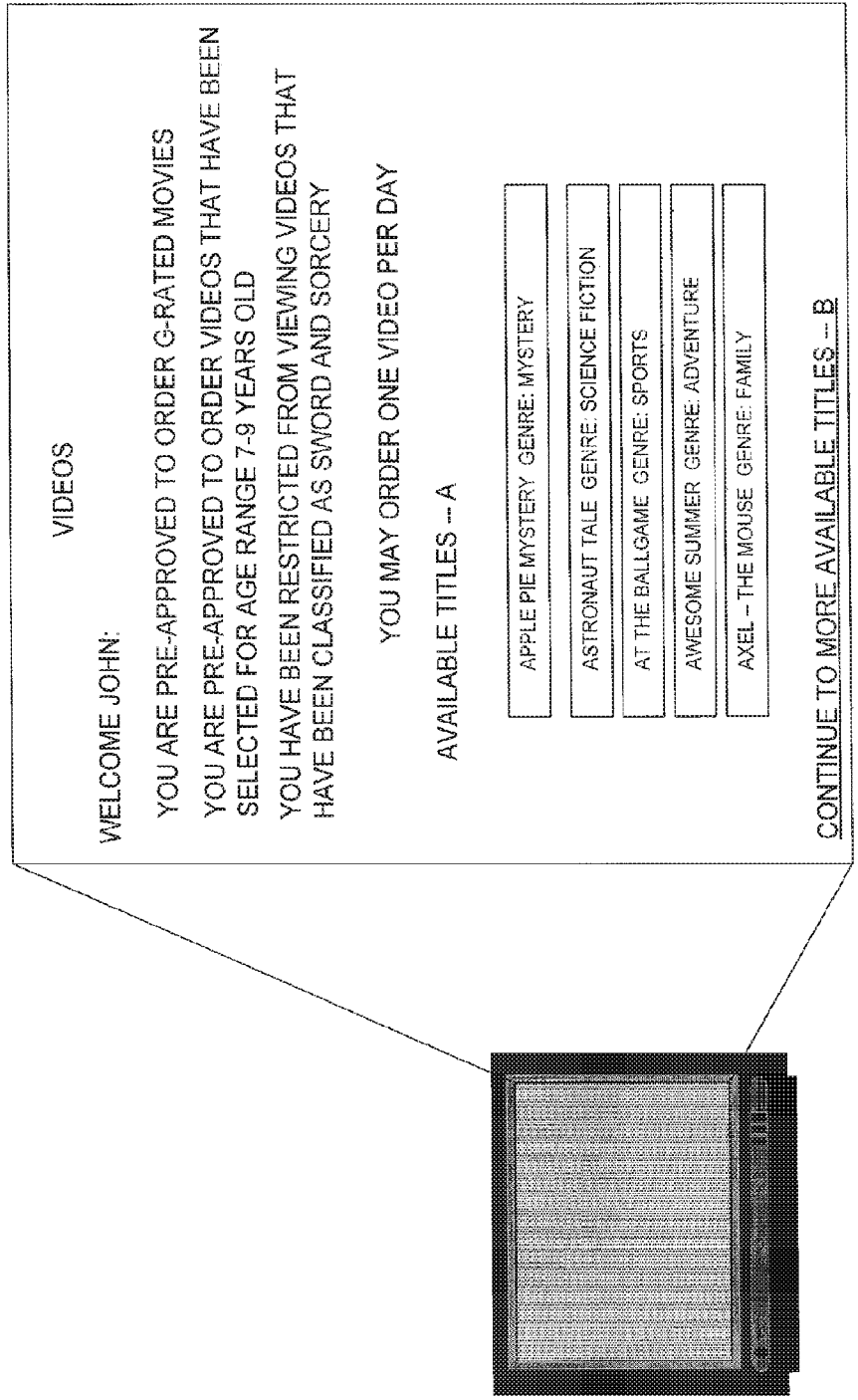

Accordingly, FIG. 18 shows an embodiment of a virtual storefront guide that is accessed using a web browser. In this example, John has accessed a video storefront. For the video storefront, John has been pre-approved to order G-rated movies; videos that have been selected for the age range of 7-9 years old; and may order one video per day (see pointer 1810). Also, John is restricted from viewing video titles that have been classified as involving sword and sorcery. Accordingly, FIG. 18 shows a portion of the titles that are available to be viewed by John (see pointer 1820), in accordance with the viewing and purchasing limits established by the administrative user, his mother. FIG. 19 shows a corresponding representation of the virtual storefront guide being displayed on a television set 170, in one embodiment.

Figure 20:
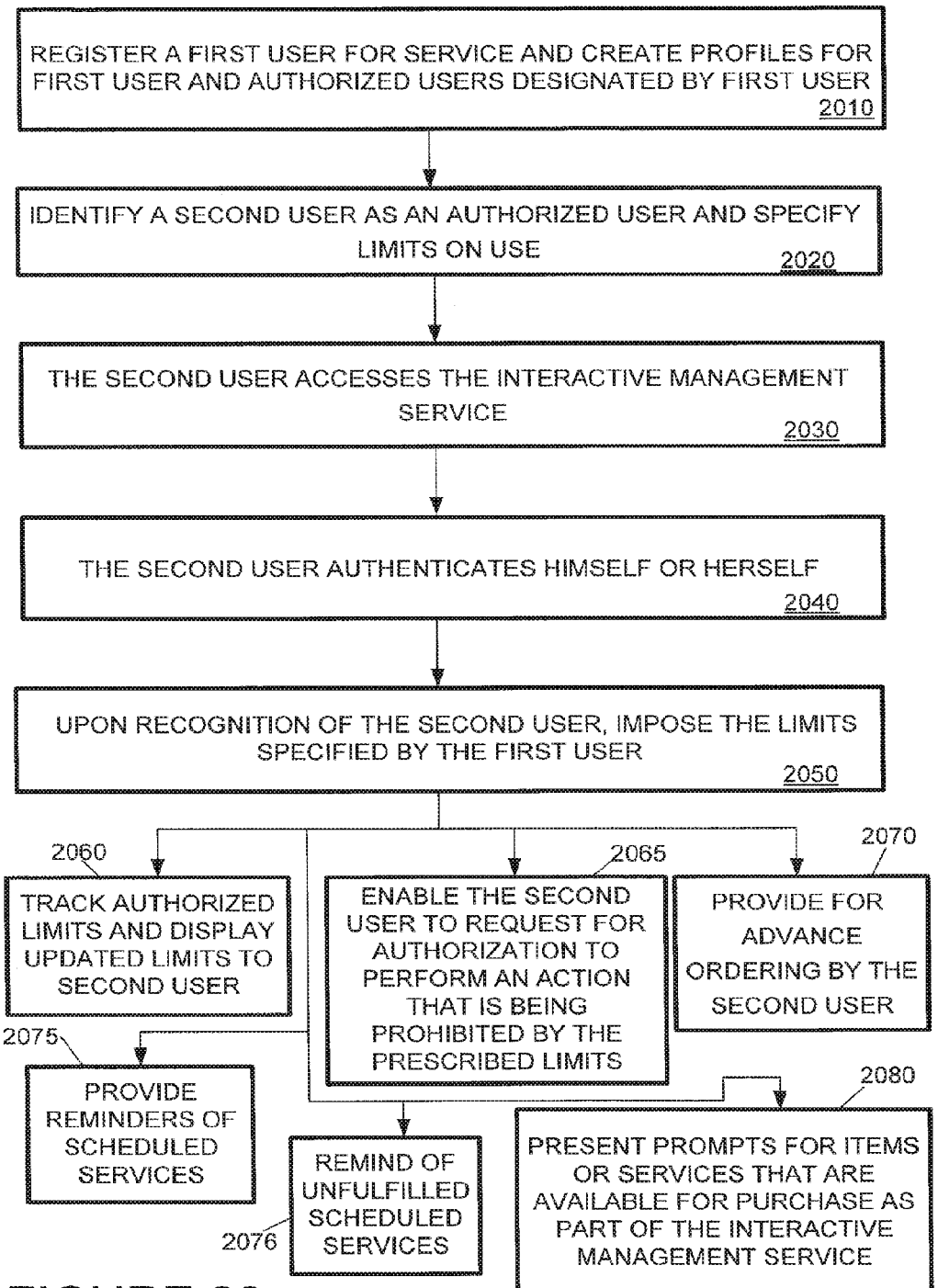
FIG. 20 is a flow chart describing one embodiment of a method for interactive purchasing within a system, such as that shown in FIG. 1.

Referring now to FIG. 20, one embodiment of a method for interactive purchasing is described. The method or process is illustrated as a set of operations shown as discrete blocks. The process may be implemented in any suitable hardware, software, firmware, or combination thereof. The order in which the operations are described is not to be construed as a limitation. At block 2010, a first user registers for interactive management service and creates an administrative profile. Information in this profile is used to govern operation of the interactive management service, such as approved payment method, identification of authorized users, designation of approved use of the service (e.g., authorized days and time), designation of whether promotions are allowed to be viewed by authorized users, monetary purchasing limits for authorized users, indication of whether users can request for authorization to purchase non-approved items or amounts, etc. Accordingly, the first user identifies or designates a second user as an authorized user of the service and a profile is created for the second user. For the profile of the second user, the first user specifies limits on the items that can be purchased by the second user, in block 2020.

The second user accesses the interactive management service (2030) and authenticates (2040) himself or herself as an authorized user. Upon recognition of the second user, the service imposes the limits specified by the first user, as shown in block 2050. Therefore, when the second user selects an item being offered for sale on the virtual storefront and the item is added to the order of the second user, limits for the order are updated. For example, if the second user is limited to purchasing one item, then this information is met with the addition of the item to the order and is displayed to the second user. Accordingly, authorized limits are tracked (2060) by the service and displayed to the second user so that the second user knows how he or she stands in regard to complying with these limits. In some embodiments, the second user may request (2065) authorization from the first user for performing an action that is being prohibited by the prescribed limits. If authorization is granted, then the attempted action is allowed to be performed. Likewise, if authorization is not granted, the attempted action is not allowed to be performed.

In some embodiments, promotional items are presented to the second user that are in compliance with the prescribed limits. In this way, promotional items may only be delivered to a user if they meet the user's prescribed limits. This is advantageous to both the user and the advertiser, since the advertiser is targeting ads to users who are capable of using the advertisement and the user is being shown advertisements that the user is able to act upon.

The interactive management service may also provide (2070) for advance ordering by the second user. Accordingly, the second user browses the available options and places an order with the interactive management service. The interactive management service then provides (2075) reminders of scheduled services to the second user. Also, the interactive management service may remind (2076) the second user of unfulfilled scheduled services.

For example, the second user or the first user on behalf of the second user may schedule for services to be specified by the second user. For instance, the second user may be expected to specify a movie to rent for each month, as part of a movie rental service. Accordingly, at or near the end of a current month, the second user may be reminded that he or she is expected to specify a movie for rent.

Also in concert with other information being provided by a participating vendor of the interactive management service, prompts may be presented (2080) to the second user as to items or services that are available for purchase by the second user as part of the interactive management service. Purchased items and services by the second user are billed to the first user.

Referring back to FIG. 1, in various embodiments, client devices 160 can be implemented in any number of ways. For example, a client device 160 may be implemented as a personal computer, where the personal computer 180 is coupled to a monitor 190 for presenting interactive management service data received by the client device. Client device 160 may also be coupled to receive data over network 120 and render the received data using associated television 170 and set-top box 162.

In some embodiments, a client device runs a virtual storefront guide application that utilizes a data file received from the media server 110 to generate a virtual storefront interface, described above.

Figure 21:
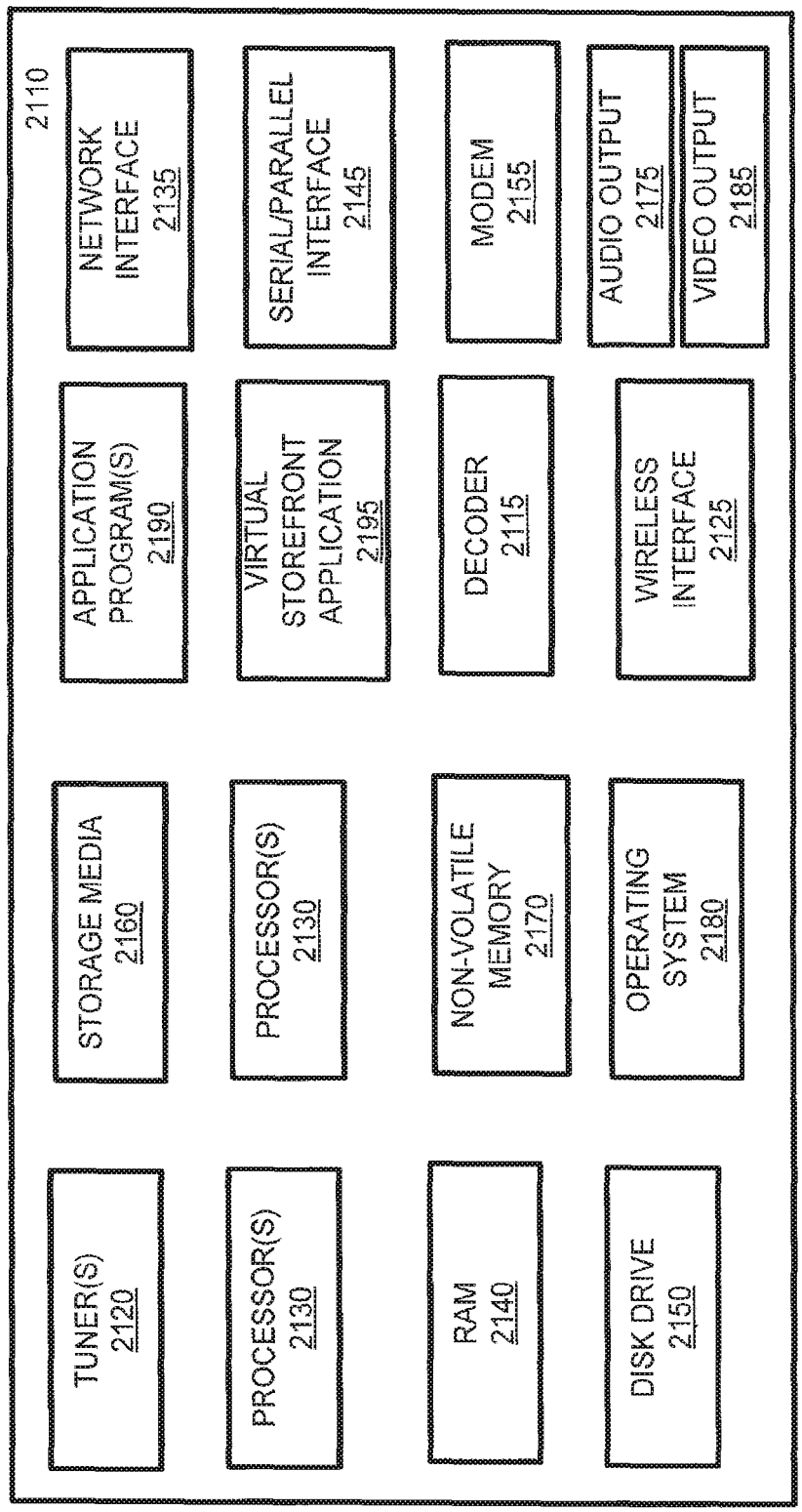
FIG. 21 is a block diagram illustrating components of one embodiment of a set-top client device, such as that shown in FIG. 1.

FIG. 21 illustrates selected components of a set-top client device 2110 that is configured to generate a virtual storefront guide or interface. Client device 2110 includes one or more tuners 2120. Tuners 2120 are representative of one or more tuners (e.g., in-band tuners) that tune to various broadcast or on-demand channels to receive media content. Tuners 2120 are also representative of a tuner (e.g., an out-of-band tuner) that tunes to a channel over which a data file may be received from media server 110. Alternatively, tuners 2120 may represent an application and/or network connection that enables client device 2110 to receive data over another type of network over which media content can be transmitted, such as an IP based network.

Client device 2110 also includes one or more processors 2130 and one or more memory components. Examples of possible memory components include a random access memory (RAM) 2140, a disk drive 2150, a mass storage component 2160, and a non-volatile memory 2170 (e.g., ROM, Flash, EPROM, EEPROM, etc.). Alternative implementations of client device 2110 can include a range of processing and memory capabilities, and may include more or fewer types of memory components than those illustrated in FIG. 21. For example, full-resource clients can be implemented with substantial memory and processing resources, including the disk drive 2150 to store content for replay by the viewer (e.g., a client device that includes a digital video recorder).

Processor(s) 2130 process various instructions to control the operation of client device 2110 and to communicate with other electronic and computing devices. The memory components (e.g., RAM 2140, disk drive 2150, storage media 2160, and non-volatile memory 2170) store various information and/or data such as media content, interactive management data, configuration information for client device 2110, and/or graphical user interface information.

An operating system 2180 and one or more application programs 2190 may be stored in non-volatile memory 2170 and executed on processor 2130 to provide a runtime environment. A runtime environment facilitates extensibility of client device 2110 by allowing various interfaces to be defined that, in turn, allow application programs 2190 to interact with client device 2110. In the illustrated example, a virtual storefront application 2195 is stored in memory 2170 to operate on a received file from the interactive management server to generate a virtual storefront guide.

Client device 2110 also includes a decoder 2115 to decode a broadcast video signal, such as an NTSC (National Television Signal Committee), PAL (Phase Alternating Line), SECAM (Sequentiel couleur à mémoire or "Color Sequential with Memory") or other TV system video signal. Client device 2110 further includes a wireless interface 2125, a network interface 2135, a serial and/or parallel interface 2145, and a modem 2155. Wireless interface 2125 allows client device 2110 to receive input commands and other information from a user-operated input device, such as from a remote control device or from another infrared, Bluetooth, or similar radio frequency (RF) input device.

Network interface 2135 and serial and/or parallel interface 2145 allow client device 2110 to interact and communicate with other electronic and computing devices via various communication links (e.g., media server 110 via network 120). Client device 2110 may also include other types of data communication interfaces to communicate with other devices. Modem 2155 facilitates communication between client device 2110 and other electronic and computing devices via a conventional telephone line.

Client device 2110 also includes an audio output 2175 and a video output 2185 that provide signals to a television or other display device that processes and/or presents or otherwise renders broadcast or on-demand programs. Although shown separately, some of the components of client device 2110 may be implemented in an application specific integrated circuit (ASIC). Additionally, a system bus (not shown) typically connects the various components within client device 2110. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

General reference is made herein to one or more client devices, such as client device 2110. As used herein, "client device" means any electronic device having data communications, data storage capabilities, and/or functions to process signals, such as broadcast signals, received from any of a number of different sources. In one implementation, functionality of the client device may be distributed such that one device, for example a personal computer 180, renders the virtual storefront guide or interface.

Figure 22:
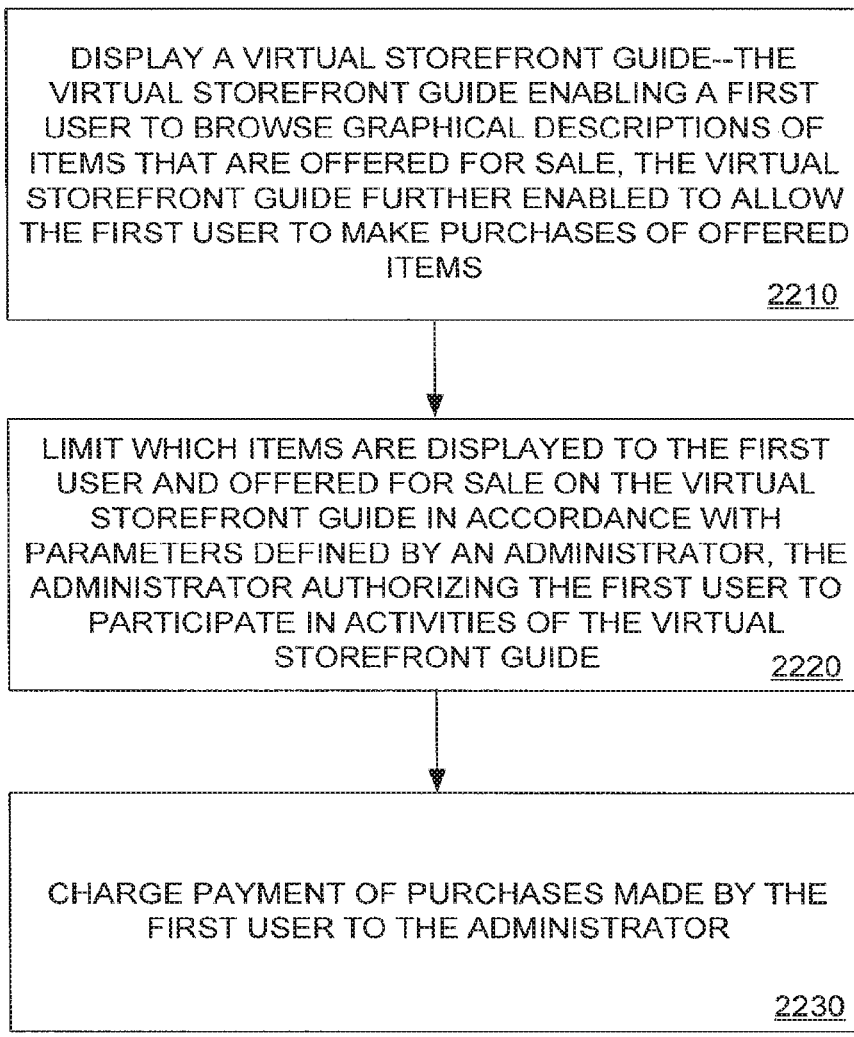
FIGS. 22-23 are flowchart diagrams describing embodiments of methods for interactive management of storefront purchases.

Referring now to FIG. 22, one embodiment of a method for interactive management of storefront purchases is depicted in a flow chart diagram. The flow chart begins with a process of displaying (2210) a virtual storefront guide—the virtual storefront guide enabling a first user to browse graphical descriptions of items that are offered for sale, the virtual storefront guide further enabled to allow the first user to make purchases of offered items. The method further includes limiting (2220) which items are displayed to the first user and offered for sale on the virtual storefront guide in accordance with parameters defined by an administrator, the administrator authorizing the first user to participate in activities of the virtual storefront guide; and charging (2230) payment of purchases made by the first user to the administrator.

Figure 23:
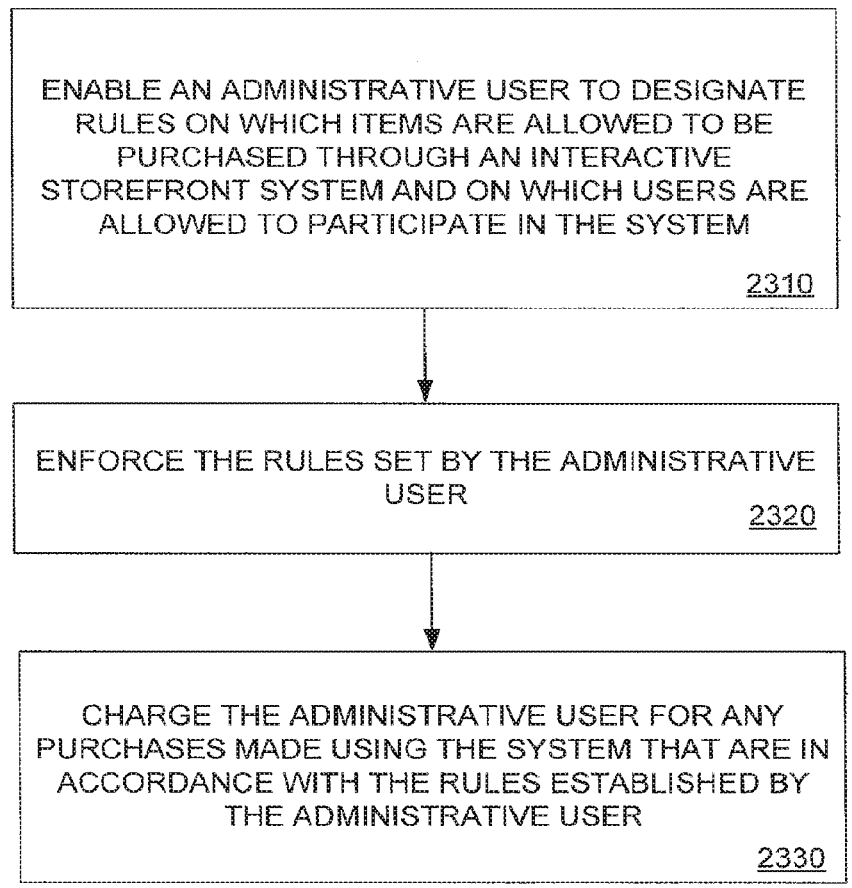

Next, in FIG. 23, an embodiment of a method for interactive management of storefront purchases is described in a flow chart diagram. Here, an administrative user is enabled (2310) to designate rules on which items are allowed to be purchased through an interactive storefront system and on which users are allowed to participate in the system. Accordingly, when a user attempts to participate in the system, the system enforces (2320) the rules set by the administrative user. The method further includes the step of charging (2330) the administrative user for any purchases made using the system that are in accordance with the rules established by the administrative user.

As previously discussed, embodiments of the present disclosure can be implemented in hardware, software, firmware, or a combination thereof. System components may be implemented in software or firmware that is stored in a memory and that is executed by a suitable instruction execution system. If implemented in hardware, components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

If implemented in software, instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the present disclosure includes embodying the functionality of the embodiments of the present disclosure in logic embodied in hardware or software-configured mediums.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that the above-described embodiments of the present disclosure are merely possible examples of implementations, merely set forth for a clear understanding of the principles of the disclosure. Many variations and modifications may be made to the above-described embodiments without departing substantially from the spirit and principles of the present disclosure. All such modifications and variations are intended to be included herein within the scope of this disclosure.

What is claimed is:

1. A method comprising:
   receiving, by a system including a hardware processor, an online order associated with a client device, the online order identifying a usercode and a first item requested for purchase;
   querying, by the system, an electronic database according to the usercode, the electronic database electronically associating electronic profiles to usercodes to identify a first electronic profile of the electronic profiles that is electronically associated with the usercode identified in the online order;
   determining, by the system, that the first electronic profile is associated with a second electronic profile;
   obtaining, by the system, an electronic description from the second electronic profile, the electronic description describing a second item; and
   automatically adding, by the system, the electronic description describing the second item to the online order associated with the client device.

2. The method of claim 1, wherein the automatically adding the electronic description describing the second item is based on a determination that the online order satisfies a pre-determined rule associated with the second electronic profile for adding items to online orders.

3. The method of claim 2, wherein the pre-determined rule requires the first item to be of a particular type.

4. The method of claim 2, wherein the pre-determined rule requires the online order to satisfy timing criteria.

5. The method of claim 1, wherein the first electronic profile is associated with the second electronic profile according to a family relationship between a first user of the first electronic profile and a second user of the second electronic profile, and further comprising storing the electronic database association between the first and second users.

6. The method of claim 1, further comprising accessing, by the system, payment information.

7. The method of claim 6, further comprising processing, by the system, the payment information for the online order.

8. The method of claim 6, further comprising processing, by the system, the payment information for the second item automatically added to the online order.

9. The method of claim 1, further comprising associating, by the system, a username to the second electronic profile.

10. A device, comprising:
    a hardware processor; and
    a memory device, the memory device storing executable instructions that, when executed by the hardware processor, facilitate performance of operations, comprising:
    querying an electronic database according to a usercode identified by an online order associated with a client device, the online order requesting a purchase of a first item, the electronic database electronically associating electronic profiles to usercodes to identify a first electronic profile of the electronic profiles that is electronically associated with the usercode identified in the online order;
    determining the first electronic profile is associated with a second electronic profile;
    obtaining an electronic description from the second electronic profile, the electronic description describing a second item; and
    automatically adding the electronic description describing the second item to the online order associated with the client device.

11. The device of claim 10, wherein the automatically adding the electronic description describing the second item is based on a determination that the online order satisfies a pre-determined rule associated with the second electronic profile for adding items to online orders.

12. The device of claim 11, wherein the pre-determined rule requires the first item to be of a particular type.

13. The device of claim 11, wherein the pre-determined rule requires the online order to satisfy timing criteria.

14. The device of claim 10, wherein the first electronic profile is associated with the second electronic profile according to a family relationship between a first user of the first electronic profile and a second user of the second electronic profile, and wherein the operations further comprise storing the electronic database association between the first and second users.

15. The device of claim 10, wherein the operations further comprise accessing payment information.

16. The device of claim 10, wherein the operations further comprise processing the payment information for the online order.

17. The device of claim 10, wherein the operations further comprise processing the payment information for the second item automatically added to the online order.

18. A machine-readable storage medium, comprising executable instructions that, when executed by a hardware processor, facilitate performance of operations, comprising:
   querying an electronic database according to a usercode identified by an online order associated with a client device, the client device requesting a purchase of a first item, the electronic database electronically associating electronic profiles to usercodes to identify a first electronic profile of the electronic profiles that is electronically associated with the usercode identified in the online order;
   determining the first electronic profile is associated with a second electronic profile;
   obtaining an electronic description from the second electronic profile, the electronic description describing a second item associated with the second electronic profile; and
   automatically adding the electronic description describing the second item to the online order associated with the client device.

19. The machine-readable storage medium of claim 18, wherein the automatically adding the electronic description describing the second item is based on a determination that the online order satisfies a pre-determined rule associated with the second electronic profile for adding items to online orders.

20. The machine-readable storage medium of claim 18, wherein the first electronic profile is associated with the second electronic profile according to a family relationship between a first user of the first electronic profile and a second user of the second electronic profile, and wherein the operations further comprise storing the electronic database association between the first and second users.

* * * * *